United States Patent
Okuyama et al.

(10) Patent No.: US 9,580,764 B2
(45) Date of Patent: Feb. 28, 2017

(54) TOP-BLOWING LANCE AND METHOD FOR REFINING MOLTEN IRON USING THE SAME

(71) Applicant: JFE Steel Corporation, Tokyo (JP)

(72) Inventors: Goro Okuyama, Tokyo (JP); Naoki Kikuchi, Tokyo (JP); Yuichi Uchida, Tokyo (JP); Yukio Takahashi, Tokyo (JP); Shingo Sato, Tokyo (JP); Kenji Nakase, Tokyo (JP); Yasutaka Ta, Tokyo (JP); Yuji Miki, Tokyo (JP)

(73) Assignee: JFE Steel Corporation (JP)

( * ) Notice: Subject to any disclaimer, the term of this patent is extended or adjusted under 35 U.S.C. 154(b) by 167 days.

(21) Appl. No.: 14/351,910

(22) PCT Filed: Oct. 16, 2012

(86) PCT No.: PCT/JP2012/006610
§ 371 (c)(1),
(2) Date: Apr. 15, 2014

(87) PCT Pub. No.: WO2013/057927
PCT Pub. Date: Apr. 25, 2013

(65) Prior Publication Data
US 2014/0298955 A1  Oct. 9, 2014

(30) Foreign Application Priority Data

Oct. 17, 2011  (JP) .................................. 2011-227627
Mar. 30, 2012  (JP) .................................. 2012-080173
Mar. 30, 2012  (JP) .................................. 2012-080174

(51) Int. Cl.
*C21C 5/32*  (2006.01)
*C21C 5/35*  (2006.01)
(Continued)

(52) U.S. Cl.
CPC .................. *C21C 5/32* (2013.01); *C21C 1/02* (2013.01); *C21C 5/35* (2013.01); *C21C 5/462* (2013.01);
(Continued)

(58) Field of Classification Search
CPC ......... C21C 5/35; C21C 5/4606; C21C 5/462; C21C 5/32; C21C 7/0037
See application file for complete search history.

(56) References Cited

U.S. PATENT DOCUMENTS 4,752,330 A  *  6/1988  Gitman ................. C21C 5/4606
266/226
6,558,614 B1 *  5/2003  Fritz ..................... C21C 5/4606
266/225

FOREIGN PATENT DOCUMENTS

DE    102008063796    *  6/2010
JP    60-067610          4/1985
(Continued)

OTHER PUBLICATIONS

Machine translation of JP 2007-092158 A published Apr. 2007.*
Supplementary European Search Report dated Feb. 1, 2016 of corresponding European Application No. 12841632.8.

*Primary Examiner* — George Wyszomierski
*Assistant Examiner* — Tima M McGuthry Banks
(74) *Attorney, Agent, or Firm* — DLA Piper LLP (US)

(57) ABSTRACT

A top-blowing lance includes a refining oxygen gas blowing nozzle having a plurality of ejection openings through which oxygen gas is blown into an iron bath in a reaction vessel, the ejection openings being disposed along a circular orbit at intervals, and a burner nozzle having an axis coaxial with the central axis of the circular orbit, forming a flame inside the refining oxygen gas blowing nozzle, and having ejection openings for blowing a powder heated by the flame into the iron bath, wherein an indicator A that indicates the positional (Continued)

relationship between the ejection openings of the refining oxygen gas blowing nozzle and the ejection openings of the burner nozzle satisfies the specified conditions.

20 Claims, 9 Drawing Sheets

(51) Int. Cl.
    *C21C 5/46*     (2006.01)
    *C21C 7/00*     (2006.01)
    *C21C 1/02*     (2006.01)
    *C21C 5/52*     (2006.01)
    *F27D 19/00*     (2006.01)

(52) U.S. Cl.
    CPC .......... *C21C 5/4606* (2013.01); *C21C 7/0037* (2013.01); *C21C 5/5217* (2013.01); *F27D 2019/0034* (2013.01); *F27D 2019/0075* (2013.01); *Y02P 10/216* (2015.11)

(56) References Cited

FOREIGN PATENT DOCUMENTS

| | | |
|---|---|---|
| JP | 09-020913 | 1/1997 |
| JP | 11-080825 | 3/1999 |
| JP | 2000-345226 | 12/2000 |
| JP | 2002-523631 | 7/2002 |
| JP | 2003-172584 | 6/2003 |
| JP | 2003268434 A * | 9/2003 |
| JP | 2004-093 | 3/2004 |
| JP | 2005-336586 | 12/2005 |
| JP | 2007-092158 | 4/2007 |
| JP | 2007092158 A * | 4/2007 |
| JP | 2011-157570 | 8/2011 |
| JP | 2011-157570 A * | 8/2011 |
| JP | 2011157570 A * | 8/2011 |

* cited by examiner

FIG. 2
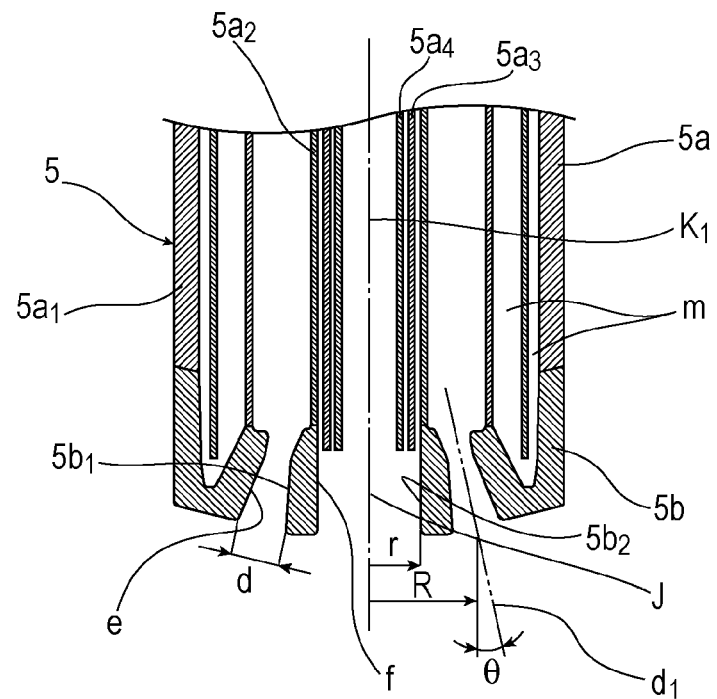
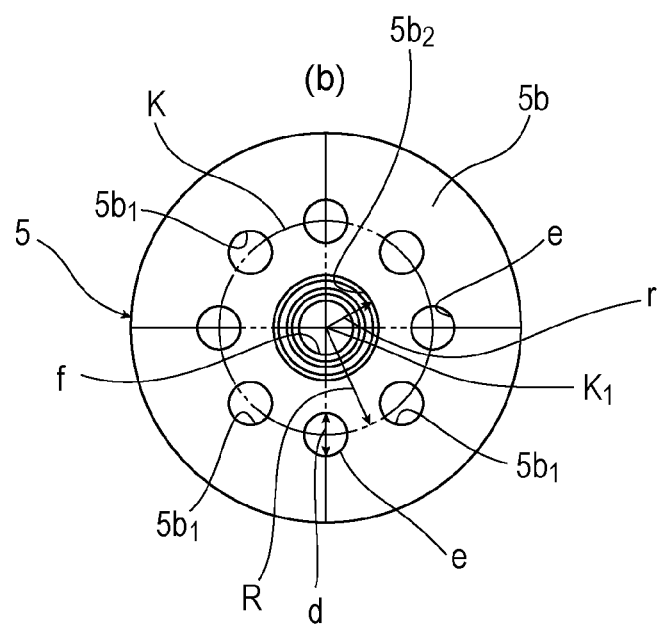

TOP-BLOWING LANCE AND METHOD FOR REFINING MOLTEN IRON USING THE SAME

TECHNICAL FIELD

This disclosure relates to a top-blowing lance having a burner function and a refining method for molten iron and a smelting reduction method using the top-blowing lance.

BACKGROUND

From the standpoint of environmental protection, there is an urgent need for $CO_2$ emission reduction in steel production processes. To reduce $CO_2$ emission in steel production processes, several measures are being studied and undertaken, including increasing the amount of cold iron source such as scrap iron, used as an iron source to reduce the blend ratio of hot metal. The reason for an increase in the amount of cold iron source is that in the production of steel products, although vast amounts of energy are required to reduce and melt iron ore and large amounts of $CO_2$ are emitted in the production of hot metal (molten iron) in a blast furnace, cold iron sources only require heat for melting and, thus, the amount of cold iron source used in steel making processes can be increased to reduce energy consumption and $CO_2$ emission. The term "molten iron" as used herein refers to a molten iron source and broadly includes hot metal produced in a blast furnace, molten steel produced from scrap iron in an electric furnace, and molten steel produced by decarburization refining of hot metal, for example.

In a steel production process including a blast furnace and a converter in combination, heat sources that melt a cold iron source mainly include the sensible heat of hot metal and the heat of combustion of carbon and silicon in the hot metal. As such, a large amount of cold iron source cannot be melted in such a steel production process intrinsically. Further, a processing step of preliminary dephosphorization of hot metal has recently been available, and the temperature of the hot metal decreases due to this additional processing step. Furthermore, decrease in the carbon and silicon concentrations of hot metal due to oxidation in preliminary dephosphorization is an unfavorable factor in melting the cold iron source. The preliminary dephosphorization of hot metal is a process of removing phosphorus in the hot metal to a certain extent by preliminarily performing dephosphorization of the hot metal before decarburization refining in a converter. In a steel production process in an ironworks, not only hot metal but also molten steel produced by decarburization of hot metal, for example, is subjected to oxidation refining such as dephosphorization.

In preliminary dephosphorization, decarburization refining in a converter, and oxidation refining in a reaction vessel, therefore, various methods of increasing the heat margin of molten iron such as hot metal or molten steel have been proposed. For example, Japanese Unexamined Patent Application Publication No. 9-20913 proposed a method of adding a carbon source to slag generated during preliminary dephosphorization and blowing an oxygen source into the slag to burn the carbon source, thereby depositing the heat of combustion of the carbon source on the hot metal.

Japanese Unexamined Patent Application Publication No. 60-67610 discloses a method of burning carbon monoxide (CO) produced in a converter with oxygen blown through a lance above a molten hot iron bath surface (secondary combustion) and depositing the heat of combustion on the molten iron.

Dephosphorization of hot metal has a problem of fluorine leached out from slag generated in the dephosphorization. Thus, there is a demand for efficient dephosphorization without using a fluorination source such as fluorite.

To this end, Japanese Unexamined Patent Application Publication No. 2000-345226 discloses a method of dephosphorization in a top and bottom blown converter, comprising blowing a mixed powder of CaO and $Al_2O_3$ over hot metal through a top-blowing lance while stirring the hot metal by blowing an agitation gas through the bottom.

Japanese Unexamined Patent Application Publication No. 11-080825 discloses a method of promoting the slagging of flux to improve the metallurgical reaction characteristics of dephosphorization, for example. In that method, oxygen gas, as well as a fuel gas such as natural gas, and a flux such as calcium oxide, are supplied to hot metal through a top-blowing lance, thereby the flux passing through a flame of the fuel gas can be supplied in a molten state to the hot metal.

Japanese Unexamined Patent Application Publication No. 2005-336586 and Japanese Unexamined Patent Application Publication No. 2007-92158 disclose a method of providing a top-blowing lance with function of a burner, ejecting a dephosphorization agent through a central hole of the burner, thereby the dephosphorization agent is heated and added to slag to promote slagging to improve the efficiency of a metallurgical reaction.

However, the related art has the following problems. The addition of a carbon source to slag in Japanese Unexamined Patent Application Publication No. 9-20913 increases the temperature of hot metal, but causes contamination with sulfur contained in the carbon source and increases the sulfur concentration of the steel. Having a sufficient combustion time of the carbon source results in a long refining time and increased production costs. Furthermore, combustion of the carbon source increases $CO_2$ emission.

To transport molten iron such as hot metal to a converter or the like, the molten iron may be contained in a reaction vessel such as a torpedo car or a ladle, that has a smaller freeboard than the converter. On the assumption that decarburization is performed, converters generally have a relatively large freeboard (2.0 to 5.0 m) in consideration of splashing during decarburization. On the other hand, the reaction vessel has a freeboard of 0.8 to 2.2 m. In actual operation in an ironworks, oxidation refining such as dephosphorization of molten iron is performed even in a reaction vessel having a relatively small freeboard. Japanese Unexamined Patent Application Publication No. 9-20913 does not give due consideration to the positional relationship between the reaction vessel and a top-blowing lance in such a case.

In the method disclosed in Japanese Unexamined Patent Application Publication No. 60-67610, CO generated in the converter and oxygen blown through the lance burn over the hot metal bath surface and heavily damages the refractory of the furnace body.

In the method disclosed in Japanese Unexamined Patent Application Publication No. 2000-345226, although added $Al_2O_3$ reduces the melting point of CaO and promotes slagging of CaO, an increased $Al_2O_3$ concentration of the slag results in damage to the refractory of the furnace body, which brings concern about increase in cost, and decrease in the dephosphorization rate.

In oxidation refining in a converter using the top-blowing lance in Japanese Unexamined Patent Application Publication No. 11-080825, the top-blowing lance height may vary during blowing. Variations in top-blowing lance height result in large differences between the flame length and the lance height. Thus, a powdery smelting agent may be ineffectively heated.

Japanese Unexamined Patent Application Publication No. 11-080825 relates to blowing in a converter using the top-blowing lance and does not relate to blowing in a reaction vessel having a relatively small freeboard. In oxidation refining, for example, dephosphorization of molten iron, since a reaction vessel has a smaller freeboard than a converter, the powdery smelting agent may be ineffectively heated with a burner flame in Japanese Unexamined Patent Application Publication No. 11-080825. It is conceivable that combustion is not completed within the lance height, unburned fuel gas reaches the molten iron bath surface, and combustion gas undergoes a decomposition reaction. This decomposition reaction is an endothermic reaction and generally a very unfavorable factor for oxidation refining such as dephosphorization in terms of the deposition of heat on the powdery smelting agent.

In the methods disclosed in Japanese Unexamined Patent Application Publication No. 11-080825, Japanese Unexamined Patent Application Publication No. 2005-336586 and Japanese Unexamined Patent Application Publication No. 2007-92158, a dephosphorization agent is transported with oxygen gas through a top-blowing lance having a quadruple or quintuple tube structure. Thus, a reactive powder, for example, containing pure iron cannot be blown through the top-blowing lance. Because of a low blowing rate and a low propane flow rate, it is not expected that the hot metal blend ratio is sufficiently reduced.

It could therefore be helpful to provide a top-blowing lance that can efficiently provide (deposit) the heat of combustion of a burner to molten iron without failures as described above and can advantageously reduce the hot metal blend ratio, and a method of refining molten iron and a smelting reduction method for molten metal using the blowing lance.

It could also be helpful to provide a method of refining molten iron including oxidation refining such as preliminary dephosphorization or decarburization refining of hot metal, the method including using a top-blowing lance having a burner function to form a burner flame at the lower end of the top-blowing lance, and while heating a powdery smelting agent with the flame by using the top-blowing lance, blowing the powdery smelting agent over the molten iron, to which a cold iron source has been added, in a converter, wherein the powdery smelting agent can be efficiently heated and the blend ratio of the cold iron source in the hot metal can be consistently increased.

It could therefore be helpful to provide a method of refining molten iron including oxidation refining such as dephosphorization of the molten iron, the method including using a top-blowing lance having a burner function to form a burner flame at the lower end of the top-blowing lance, and while heating a powdery smelting agent with the flame by using the top-blowing lance, blowing the powdery smelting agent over the molten iron in a reaction vessel having a relatively small freeboard, wherein the powdery smelting agent can be efficiently heated and the heat margin of the molten iron in the reaction vessel can be increased.

SUMMARY

We thus provide:

(1) A top-blowing lance having a burner function, including a refining oxygen gas blowing nozzle having a plurality of ejection openings through which oxygen gas is blown into an iron bath in a reaction vessel, the ejection openings being disposed along a circular orbit at intervals, and a burner nozzle having an axis coaxial with the central axis of the circular orbit, forming a flame inside the refining oxygen gas blowing nozzle, and having ejection openings for blowing a powder heated by the flame into the iron bath, wherein an indicator A that indicates the positional relationship between the refining oxygen gas blowing nozzle and the burner nozzle satisfies the following condition:

$$A=1.7(R-r-d/2)/L+\tan(\theta-12°)-0.0524>0$$

where R denotes the pitch circle radius of the refining oxygen gas blowing nozzle (mm), r denotes the opening radius of the burner nozzle (mm), d denotes the diameter of the refining oxygen nozzle (mm), $\theta$ denotes the angle (inclination) between the axis of the refining oxygen gas blowing nozzle and the central axis of the circular orbit (°), and L denotes the lance height (mm).

(2) The top-blowing lance having a burner function according to (1), wherein the top-blowing lance is a refining top-blowing lance for use in dephosphorization blowing or decarburization blowing.

(3) A method of refining molten iron in a reaction vessel using the top-blowing lance according to (1) or (2), wherein a fuel for the burner nozzle is one or two or more of gaseous fuels, such as propane gas and Coke oven gas, liquid fuels, such as heavy oil, and solid fuels, such as plastics.

(4) A smelting reduction method of charging the iron bath type smelting furnace with a powder or grains of a metal oxide or an oxide ore and smelting and reducing the powder or the grains to produce molten metal, including blowing a powder auxiliary material a granular auxiliary material of one or two or more of metal oxides and oxide ores into the iron bath type smelting furnace through the burner nozzle of the top-blowing lance according to any one of (1) to (3).

(5) A method of refining molten iron, including using a top-blowing lance including a powdery smelting agent supply path, a fuel gas supply path, a combustion oxidizing gas supply path for a fuel gas, and a refining oxidizing gas supply path; supplying a fuel gas through the fuel gas supply path and supplying a combustion oxidizing gas through the combustion oxidizing gas supply path to form a flame in front of a nozzle of the top-blowing lance toward a molten iron bath surface in a converter; and supplying a powdery smelting agent through the powdery smelting agent supply path and supplying a refining oxidizing gas to the molten iron bath surface through the refining oxidizing gas supply path, while heating the powdery smelting agent with the flame and blowing the powdery smelting agent to the molten iron bath surface, wherein when the converter has a freeboard in the range of 2.0 to 5.0 m, the top-blowing lance having a burner function according to (1) is used as the top-blowing lance to form the flame such that the flow ratio of the combustion oxidizing gas to the fuel gas satisfies the following formula (1):

$$0.4 \leq (G/F)/(G/F)_{st} \leq 1.0 \tag{1}$$

where G denotes the combustion oxidizing gas supply rate (Nm$^3$/min),

F denotes the fuel gas supply rate (Nm$^3$/min), and $(G/F)_{st}$ denotes the stoichiometric coefficient ratio of the combustion oxidizing gas required for complete combustion of the fuel gas to the fuel gas.

(6) The method of refining molten iron according to (5), wherein the combustion oxidizing gas supply rate G is controlled such that the combustion oxidizing gas discharge velocity $V_G$ satisfies the following formula (2):

$$0.2 \leq V_G/C \leq 1.0 \qquad (2)$$

where $V_G$ denotes the combustion oxidizing gas discharge velocity (Nm/s), and

C denotes the speed of sound (Nm/s).

(7) The method of refining molten iron according to (5) or (6), wherein the powdery smelting agent contains at least one of iron oxide, calcium flux, and combustible substances, and the powdery smelting agent, together with an inert gas, is supplied to the molten iron bath surface to perform oxidation refining of the molten iron to which a cold iron source has been added.

(8) The method of refining molten iron according to (7), wherein the molten iron is hot metal, and the oxidation refining is preliminary dephosphorization of the hot metal.

(9) A method of refining molten iron, including by using a top-blowing lance including a powdery smelting agent supply path, a fuel gas supply path, a combustion oxidizing gas supply path for a fuel gas, and a refining oxidizing gas supply path; supplying a fuel gas through the fuel gas supply path and supplying a combustion oxidizing gas through the combustion oxidizing gas supply path to form a flame in front of a nozzle of the top-blowing lance toward a molten iron bath surface in a reaction vessel; and supplying a powdery smelting agent containing at least one of iron oxide, calcium flux and combustible substances to the molten iron bath surface together with an inert gas through the powdery smelting agent supply path and supplying a refining oxidizing gas to the molten iron bath surface through the refining oxidizing gas supply path, while heating the powdery smelting agent with the flame and blowing the powdery smelting agent to the molten iron bath surface, wherein when the reaction vessel has a freeboard in the range of 0.5 to 2.0 m, the top-blowing lance having a burner function according to (1) is used as the top-blowing lance to form the flame such that the flow ratio of the combustion oxidizing gas to the fuel gas satisfies the following formula (3):

$$1.0 \leq (G/F)/(G/F)_{st} \leq 5.0 \qquad (3)$$

where G denotes the combustion oxidizing gas supply rate (Nm³/min),

F denotes the fuel gas supply rate (Nm³/min), and $(G/F)_{st}$ denotes the stoichiometric coefficient ratio of the combustion oxidizing gas required for complete combustion of the fuel gas to the fuel gas.

(10) The method of refining molten iron according to (9), wherein the combustion oxidizing gas supply rate G is controlled such that the combustion oxidizing gas discharge velocity satisfies the following formula (4):

$$1.0 \leq V_G/C \leq 3.0 \qquad (4)$$

where $V_G$ denotes the combustion oxidizing gas discharge velocity (Nm/s), and

C denotes the speed of sound (Nm/s).

(11) The method of refining molten iron according to (9) or (10), wherein the molten iron is hot metal, and the refining of the molten iron with the refining oxidizing gas is dephosphorization of the hot metal.

In our top-blowing lance having a burner function, an indicator A that indicates the positional relationship between a refining oxygen gas blowing nozzle and a burner nozzle satisfies $A=1.7(R-r-d/2)/L+\tan(\theta-12°)-0.0524>0$. This reduces the interference between a refining oxygen gas to be blown and a flame formed by the burner and thereby maintains a high temperature of the burner flame. This allows a powder to be efficiently heated and, and as a result, improves the heat deposition efficiency of molten iron.

Such a top-blowing lance having a burner function can improve the heat deposition efficiency of molten iron. Thus, the use of such a top-blowing lance as a refining top-blowing lance in dephosphorization blowing or decarburization blowing allows a large amount of scrap to be used and can greatly reduce the hot metal blend ratio. Improved heat deposition efficiency can provide savings in the use of carbon materials and reduce $CO_2$ emission.

Our top-blowing lance uses one or two or more of gaseous fuels, such as propane gas and C gas, liquid fuels, such as heavy oil, and solid fuels, such as plastics, as a fuel for a burner nozzle, thereby allowing the refining of molten iron in an iron bath type smelting furnace.

Our top-blowing lance can also be used to supply a granular auxiliary material of one or two or more of metal oxides and oxide ores to molten metal through a burner nozzle of the top-blowing lance, thereby allowing the molten metal to be subjected to smelting reduction.

The flow ratio of a combustion oxidizing gas supplied through a combustion oxidizing gas supply path to a fuel gas supplied through a fuel gas supply path of a top-blowing lance to form a burner flame downward from the tip thereof is controlled within a predetermined range relative to the stoichiometric coefficient ratio of the combustion oxidizing gas required for complete combustion of the fuel gas to the fuel gas. Thus, the ratio (l/L) of the flame length l (m) to the top-blowing lance height L (m) can be set at 0.8 or more and 1.2 or less. As a result, the heat of the flame can be effectively transferred to a powdery smelting agent supplied through the top-blowing lance. The heated powdery smelting agent can improve the heat margin of the molten iron. This can greatly increase the blend ratio of a cold iron source, such as scrap iron, for example, in the oxidation refining of molten iron in a converter. This can also effectively reduce the amount of carbon material for carburization, which is added to consistently maintain high heat deposition efficiency of molten iron in a reaction vessel, and reduce $CO_2$ emission.

BRIEF DESCRIPTION OF THE DRAWINGS

FIGS. 2(a) and 2(b) are schematic views of the specific structures of the top-blowing lance according to the first example.

REFERENCE SIGNS LIST

Figure 1:
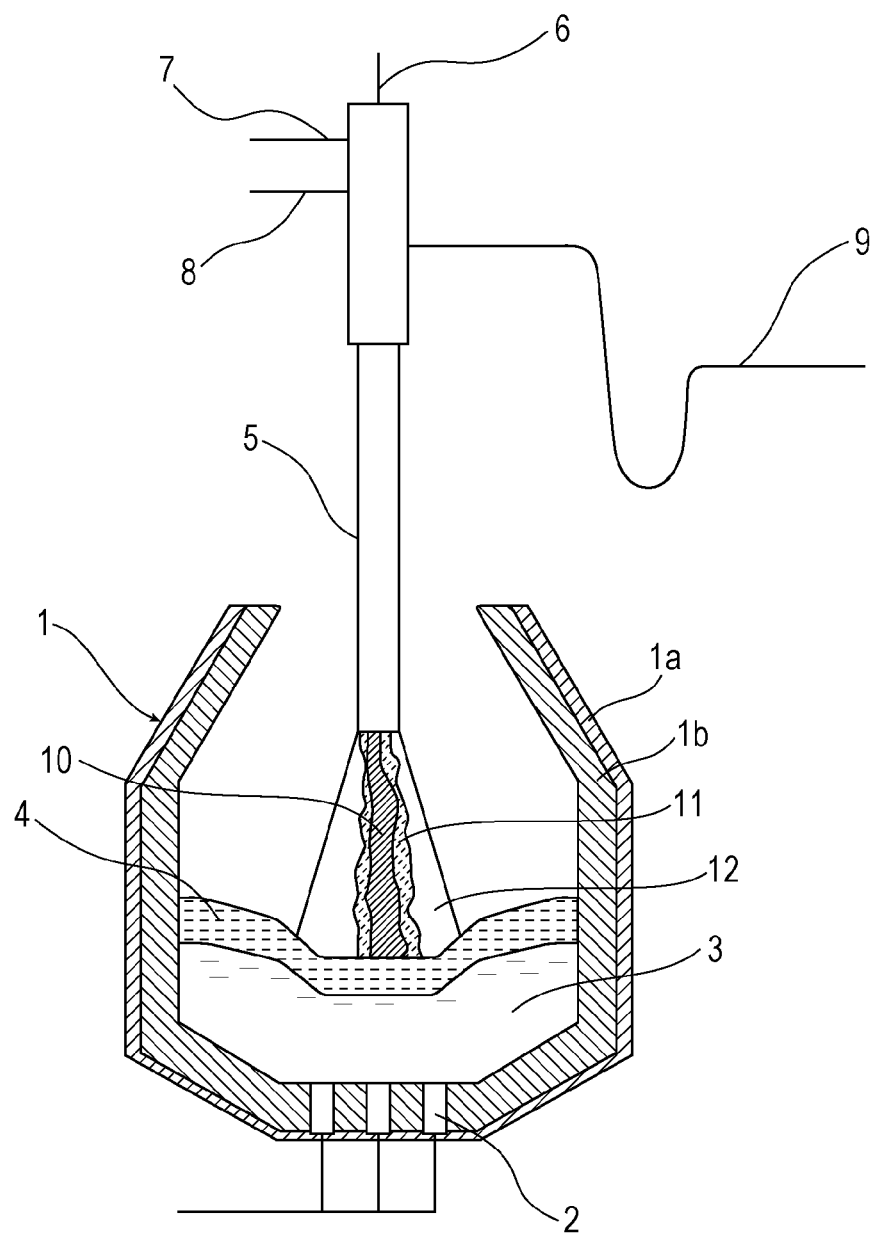
FIG. 1 is a schematic view of a top-blowing lance according to a first example installed in a converter type smelting facility.

1 furnace body
1a shell
1b refractory layer
2 bottom-blowing tuyere
3 molten iron
4 slag
5 top-blowing lance
5a lance main body
5$a_1$ outer tube
5$a_2$ inner tube
5$a_3$ tube
5$a_4$ tube
5b nozzle portion
5$b_1$ refining oxygen blowing nozzle
5$b_2$ burner nozzle
6 refining oxygen gas supply pipe
7 combustion oxygen gas supply pipe
8 fuel gas supply pipe
9 powder supply pipe
10 powder
11 flame
12 refining oxygen gas
e ejection opening
f ejection opening
101 converter facility
102 furnace main body
103 top-blowing lance
104 shell
105 refractory
106 tapping hole
107 bottom-blowing tuyere
108 gas-inlet pipe
109 powdery smelting agent supply pipe
109A smelting agent transport gas supply pipe
110 fuel gas supply pipe
111 combustion oxidizing gas supply pipe
112 refining oxidizing gas supply pipe
113 dispenser
114 lance main body
115 lance chip
116 central hole
117 fuel gas nozzle
118 combustion oxidizing gas nozzle
119 surrounding holes
120 innermost tube
121 partition tube
122 inner tube
123 middle tube
124 outer tube
125 outermost tube
126 hot metal
127 slag
128 agitation gas
129 powdery smelting agent
131 powdery smelting agent supply path
132 fuel gas supply path
133 combustion oxidizing gas supply path
134 refining oxidizing gas supply path
201 smelting facility
202 reaction vessel
203 top-blowing lance
204 powdery smelting agent supply pipe
204A smelting agent transport gas supply pipe
205 fuel gas supply pipe
206 combustion oxidizing gas supply pipe
207 refining oxidizing gas supply pipe
213 dispenser
214 lance main body
215 lance chip
216 central hole
217 fuel gas nozzle
218 combustion oxidizing gas nozzle
219 surrounding holes
220 innermost tube
221 partition tube
222 inner tube
223 middle tube
224 outer tube
225 outermost tube
226 hot metal
227 slag
228 powdery smelting agent
231 powdery smelting agent supply path
232 fuel gas supply path
233 combustion oxidizing gas supply path
234 refining oxidizing gas supply path

DETAILED DESCRIPTION

First Example

Our lances and methods will be more specifically described with reference to the accompanying drawings.

FIG. 1 is a schematic view showing a top-blowing lance installed in a converter type smelting facility. FIGS. 2(a) and 2(b) are enlarged sectional views of the tip of a top-blowing lance. A reaction vessel in a first example includes an iron bath type smelting furnace, for example.

In the figures, the reference numeral 1 denotes a furnace body. The furnace body 1 includes a shell 1a, which constitutes the skeleton of the furnace body 1, and a refractory layer 1b formed inside the shell 1a.

The reference numeral 2 denotes a bottom-blowing tuyere which is disposed at the bottom of the furnace body 1, and through which an inert gas such as Ar gas is blown through the bottom-blowing tuyere to agitate an iron bath in refining. The reference numeral 3 denotes molten iron in the furnace body 1. The reference numeral 4 denotes slag floating on the molten iron. The reference numeral 5 denotes a top-blowing lance disposed vertically with the tip thereof facing downward.

An upper end of the top-blowing lance 5 is coupled to a refining oxygen gas supply pipe 6, a combustion oxygen gas supply pipe 7, a fuel gas supply pipe 8, and a powder supply pipe 9.

The reference numeral 10 denotes a powder blown through the top-blowing lance 5. The reference numeral 11 denotes a flame formed by fuel combustion. The reference numeral 12 denotes a refining oxygen gas blown together with the powder 10.

As specifically illustrated in FIGS. 2(a) and 2(b), the top-blowing lance 5 is composed of 2a lance main body 5a and a nozzle portion 5b joined to the tip of the lance main body 5a.

The lance main body 5a includes an outer tube $5a_1$ having a cooling water circuit m and an inner tube $5a_2$ concentrically disposed inside the outer tube $5a_1$ so as to form a blowing path for refining oxygen gas.

The nozzle portion 5b includes a blowing nozzle $5b_1$ to refine oxygen gas, through which oxygen gas is blown into the iron bath contained in the furnace body 1, and a burner nozzle $5b_2$. The powder 10, together with a carrier gas, such as an inert gas, is blown through the innermost path in the inner tube $5a_2$.

Tubes $5a_3$ and $5a_4$, which constitute a combustion oxidizing gas supply path and a fuel supply path, may be concentrically disposed inside the inner tube $5a_2$ of the lance main body 5a as appropriate. In this case, the innermost tube $5a_4$ constitutes a powder supply path.

The refining oxygen gas blowing nozzle $5b_1$ has a plurality of ejection openings e disposed along a circular orbit K (see FIG. 2(b)) at intervals in communication with the refining oxygen gas blowing path.

The burner nozzle $5b_2$ has an axis J that is coaxial with the central axis $K_1$ of the circular orbit K and forms a flame 11 inside the ejection openings e of the refining oxygen gas blowing nozzle $5b_1$. The burner nozzle $5b_2$ has an ejection opening f to blow the powder 10 heated with the flame 11 into the iron bath.

The circular orbit K is indicated by a virtual line. When the axis of each of the ejection openings e is disposed on the circular orbit K, the circular orbit K is referred to as a pitch circle of the ejection openings e.

An indicator A that indicates the positional relationship between the refining oxygen gas blowing nozzles 5a and the burner nozzle 5b satisfies the condition $A=1.7(R-r-d/2)/L+\tan(\theta-12°)-0.0524>0$, where R (mm) denotes the radius of the pitch circle of the ejection openings e of the refining oxygen gas blowing nozzles $5b_1$, r (mm) denotes the radius of the ejection opening f of the burner nozzle $5b_2$, d (mm) denotes the diameter of the ejection openings e of the refining oxygen nozzle $5b_1$, $\theta(°)$ denotes the angle (inclination) between the axis d1 of the ejection openings e of the refining oxygen gas blowing nozzle $5b_1$ and the central axis $K_1$ of the circular orbit, and L denotes the lance height (the vertical distance from the iron bath surface to the nozzle tip of the lance).

The reason for the positional relationship between the refining oxygen gas blowing nozzle $5b_1$ and the burner nozzle $5b_2$ satisfies $A=1.7(R-r-d/2)/L+\tan(\theta-12°)-0.0524>0$ in the top-blowing lance will be described in detail below.

We thought that when powder of metal oxide or oxide is blown through a lance, heating the blown powder before the powder contacts molten iron can effectively reduce the hot metal blend ratio and they studied on methods for heating and adding powder.

A vertical tubular furnace having an inner diameter of 1 m and a height of 3 m was used to investigate the state of heated powder. Various top-blowing lances each of which can supply powder through its central portion and has a burner function as shown in Table 1 were installed on an upper portion of the vertical tubular furnace. A powder (lime having a size of 75 mm or less) blow experiment was conducted using the above various top-blowing lances and temperature of blown powder was measured with a radiation thermometer.

TABLE 1

| No. | r(mm) | R(mm) | d(mm) | θ(°) | L(mm) | A-value (—) | Powder temperature (° C.) | |
|---|---|---|---|---|---|---|---|---|
| 1 | 11.6 | 25 | 7 | 12 | 500 | −0.019 | 720 | Comparative Example |
| 2 | 11.6 | 25 | 7 | 14 | 500 | 0.016 | 1720 | Present invention |
| 3 | 11.6 | 25 | 7 | 16 | 500 | 0.051 | 1653 | Present invention |
| 4 | 11.6 | 17.5 | 7 | 14 | 500 | −0.009 | 872 | Comparative Example |
| 5 | 11.6 | 17.5 | 7 | 16 | 500 | 0.026 | 1632 | Present invention |
| 6 | 15 | 25 | 7 | 14 | 500 | 0.005 | 1532 | Present invention |
| 7 | 17.5 | 25 | 7 | 14 | 500 | −0.004 | 1250 | Comparative Example |
| 8 | 20 | 25 | 7 | 14 | 500 | −0.012 | 850 | Comparative Example |
| 9 | 13.2 | 50 | 9.1 | 15 | 500 | 0.110 | 1856 | Present invention |
| 10 | 13.2 | 50 | 9.1 | 10 | 500 | 0.022 | 1515 | Present invention |
| 11 | 11.6 | 25 | 7 | 14 | 1000 | −0.001 | 1300 | Comparative Example |
| 12 | 11.6 | 25 | 7 | 16 | 1000 | 0.034 | 1600 | Present invention |
| 13 | 13.2 | 50 | 9.1 | 15 | 3000 | 0.018 | 1550 | Present invention |

Figure 3:
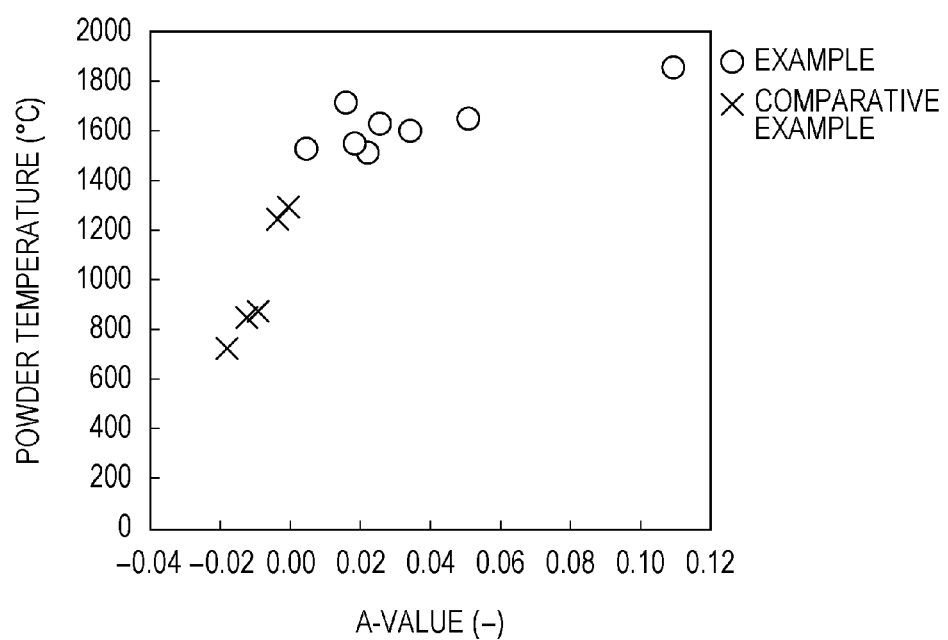
FIG. 3 is a graph of the relationship between powder temperature and A-value according to the first example.

FIG. 3 illustrates the results. We found from the results illustrated in FIG. 3 that when the positional relationship between the refining oxygen gas blowing nozzles $5b_1$ and the burner nozzle $5b_2$ in the top-blowing lance satisfied $A=1.7(R-r-d/2)/L+\tan(\theta-12°)-0.0524>0$ the powder temperature increased significantly.

This condition was calculated from the loci of expanses of a jet of burner gas and a jet of refining oxygen gas and is based on the thought that excessive contact (interference) between the refining oxygen gas and the burner flame reduces the burner flame temperature. Under the condition, interference between the refining oxygen gas and the burner flame is reduced and a high burner flame temperature can be maintained. Thus, the powder can be efficiently heated.

In dephosphorization refining (blowing) or decarburization refining while a top-blown refining oxygen gas is blown, an auxiliary material powder can be efficiently heated with a burner flame and supplied to molten iron. Thus, a larger amount of scrap than before can be melted.

This can reduce the cost of melting and refining associated with dephosphorization and decarburization refining, and achieves resource conservation and energy conservation. This can also stabilize converter operation and produce industrially beneficial effects.

The A-value is preferably 0.20 as the upper limit to prevent erosion of the refractory due to secondary combustion of the refining oxygen gas.

The lance height L is set at approximately 2000 to 5000 mm in the converter operation. In a reaction vessel having a freeboard of 0.5 to 2 m, the lance height L is 500 to 2000 mm.

Molten iron to be treated with a top-blowing lance is preferably molten iron produced in hot metal production facilities such as blast furnaces, (molten iron used in a dephosphorization process) or dephosphorized molten iron after a dephosphorization process.

In the refining of molten iron, a fuel for a burner nozzle may be one or two or more of gaseous fuels such as propane gas and C gas, liquid fuels such as heavy oil, and solid fuels such as plastics.

In charging a powder or grains of a metal oxide or an oxide ore into an iron bath type smelting furnace to produce molten metal by smelting reduction, a carbon material to reduce the oxide and a carbon material to compensate for reduction heat must be additionally added. The metal oxide or the oxide ore may be iron ore, a sintered powder, chromium ore, manganese ore, or dust formed in ironmaking.

Example 1

A top-blowing lance having a structure as illustrated in FIG. 2 was used. Hot metal having a composition as shown in Table 2 was charged together with scrap iron into a top and bottom blown converter having a capacity of 2.5 tons as illustrated in FIG. 1 and subjected to dephosphorization blowing under the conditions as shown in Table 3.

After tapping and slagging, dephosphorized hot metal was charged together with scrap iron into the top and bottom blown converter and was subjected to decarburization blowing under the conditions shown in Table 3. The effect of the A-value of the top-blowing lance on the hot metal blend ratio was studied. Table 4 shows the results.

In the dephosphorization blowing, the furnace was charged with scrap iron and then with molten iron having a temperature to be 1350° C. A blowing oxygen gas was supplied through the top-blowing lance. Simultaneously, a calcium oxide powder, a combustion oxygen gas, and propane gas were blown to the surface of molten iron, and argon gas was blown as an agitation gas into the molten iron through bottom-blowing tuyeres.

In this blowing, the charging amount of scrap iron was adjusted such that the dephosphorization finish temperature was 1400° C. The adding amount of calcium oxide was adjusted such that the basicity (mass % CaO/mass % SiO$_2$) of furnace slag was 2.5.

In the decarburization blowing, the furnace was charged with scrap iron and then with molten iron (dephosphorized molten iron) having a temperature to be 1350° C. A blowing oxygen gas was supplied through the top-blowing lance. Simultaneously, a calcium oxide powder, a combustion oxygen gas, and propane gas were blown the surface of molten iron, and argon gas was blown as an agitation gas into the molten iron through a bottom-blowing tuyere.

The charging amount of scrap iron was adjusted such that the decarburization finish temperature was 1680° C. and the carbon concentration was 0.05 mass %. The adding amount of calcium oxide was adjusted such that the basicity (mass % CaO/mass % SiO$_2$) of furnace slag was 3.5.

TABLE 2

| Example | Molten iron temperature (° C.) and chemical composition (mass %) | | | | | | |
|---|---|---|---|---|---|---|---|
| | Temperature | C | Si | Mn | P | S | Cr |
| Dephosphorization blowing | 1,350 | 4.4 | 0.20 | 0.21 | 0.120 | 0.011 | tr |
| Decarburization blowing | 1,350 | 3.2 | 0.05 | 0.08 | 0.026 | 0.010 | tr |

TABLE 3

| | Top-blowing lance | | | | | Bottom-blowing lance |
|---|---|---|---|---|---|---|
| | Calcium oxide kg/min | Propane gas | Combustion oxygen gas Nm$^3$/min | Blowing oxygen gas | Lance height m | Argon gas Nm$^3$/min |
| Dephosphorization blowing | 11 | 0.2 | 1.0 | 5.0 | 0.5 | 0.25 |
| Decarburization blowing | 5 | 0.1 | 0.5 | 7.5 | 0.3 | 0.25 |

TABLE 4

| | | Heat size ton | Blowing time min | Scrap iron blend ratio % | Rating |
|---|---|---|---|---|---|
| Example 1 A-value = 0.110 | Dephosphorization blowing | 2.5 | 8.0 | 9.3 | ○ |
| | Decarburization blowing | 2.5 | 16.1 | 4.2 | |
| | Total | — | 24.1 | 13.5 | |
| Example 2 A-value = 0.051 | Dephosphorization blowing | 2.5 | 7.8 | 8.4 | ○ |
| | Decarburization blowing | 2.5 | 16.2 | 3.8 | |
| | Total | — | 24.0 | 12.2 | |

TABLE 4-continued

| | | Heat size ton | Blowing time min | Scrap iron blend ratio % | Rating |
|---|---|---|---|---|---|
| Example 3 A-value = 0.016 | Dephosphorization blowing | 2.5 | 8.1 | 8.5 | ○ |
| | Decarburization blowing | 2.5 | 15.3 | 4.1 | |
| | Total | — | 23.4 | 12.6 | |
| Comparative Example 1 A-value = −0.012 | Dephosphorization blowing | 2.5 | 8.3 | 4.1 | X |
| | Decarburization blowing | 2.5 | 16.0 | 2.7 | |
| | Total | — | 24.3 | 6.8 | |
| Comparative Example 2 A-value = −0.019 | Dephosphorization blowing | 2.5 | 7.9 | 3.3 | X |
| | Decarburization blowing | 2.5 | 15.8 | 2.9 | |
| | Total | — | 23.7 | 6.2 | |

As is clear from Table 4, the use of a blowing lance having a burner function in dephosphorization and decarburization blowing can increase the scrap iron blend ratio and greatly decrease the hot metal blend ratio.

To perform the smelting reduction of molten metal using a blowing lance, 2.5 tons of hot metal was charged in a converter and blowing was started at a refining oxygen gas flow rate of 7.5 Nm$^3$/min and a bottom-blown nitrogen gas flow rate of 0.25 Nm$^3$/min while coke was appropriately supplied to the converter.

Then the hot metal temperature was increased to 1600° C. At the time when the hot metal temperature reached 1600° C., the hot metal began to be supplied with a chromium ore powder through the top-blowing lance to perform smelting reduction blowing. In this smelting reduction blowing, propane gas and oxygen gas for the burner also began to be supplied through the top-blowing lance, when smelting reduction blowing was started.

The flow rates of the propane and oxygen gas were 0.2 and 1.0 Nm$^3$/min, respectively. During the smelting reduction blowing, the temperature of the hot metal was measured as needed, and the supply rate of the chromium ore powder was altered such that the temperature of the hot metal was 1600° C., which was suitable for smelting reduction.

After an elapse of a predetermined time (approximately 30 minutes), the supply of the chromium ore powder, propane and oxygen gas was stopped, and blowing was continued for another three minutes only with the supply of a top-blown oxygen gas.

Table 5 shows the result of the investigation about the relationship between the usage index of the chromium ore and the A-value in the smelting reduction blowing together with the results of Comparative Examples (Comparative Examples 3 and 4; the blowing conditions for Comparative Examples 3 and 4 were the same as for Examples 4 and 5). The usage indexes of the chromium ore in the table were based on the usage indexes in Example 5, which was set at 1.00.

TABLE 5

| | A-value (—) | Smelting reduction time (min) | Usage index of chromium ore in smelting reduction (—) | Rating |
|---|---|---|---|---|
| Example 4 | 0.110 | 31.0 | 1.15 | ○ |
| Example 5 | 0.051 | 32.0 | 1.00 | ○ |
| Comparative Example 3 | −0.012 | 32.0 | 0.82 | X |
| Comparative Example 4 | −0.019 | 31.0 | 0.79 | X |

As is clear from Table 5, the usage index of the chromium ore in the smelting reduction blowing was low in Comparative Examples 3 and 4, which had an A-value of zero or less.

Second Example

A second example is directed to oxidation refining performed by supplying a refining oxidizing gas to hot metal in a converter through a top-blowing lance. Such oxidation refining presently prevailing includes preliminary dephosphorization of hot metal and decarburization refining of hot metal. The method can be applied to both of these oxidation refining treatments. In the context of decarburization refining of hot metal, our methods may be applied to hot metal subjected to preliminary dephosphorization or hot metal not subjected to preliminary dephosphorization. Our methods can be applied to preliminary dephosphorization, and hot metal refined by the preliminary dephosphorization can be subjected to decarburization refining in a converter.

Hot metal (molten iron) is produced by a blast furnace. This hot metal (molten iron) is received by a hot metal transport container such as a hot metal ladle or a torpedo car and transported to a converter in which preliminary dephosphorization and decarburization refining are performed. Our methods will be more specifically described in the following exemplary preliminary dephosphorization of hot metal in a converter with reference to the accompanying drawings.

Figure 4:
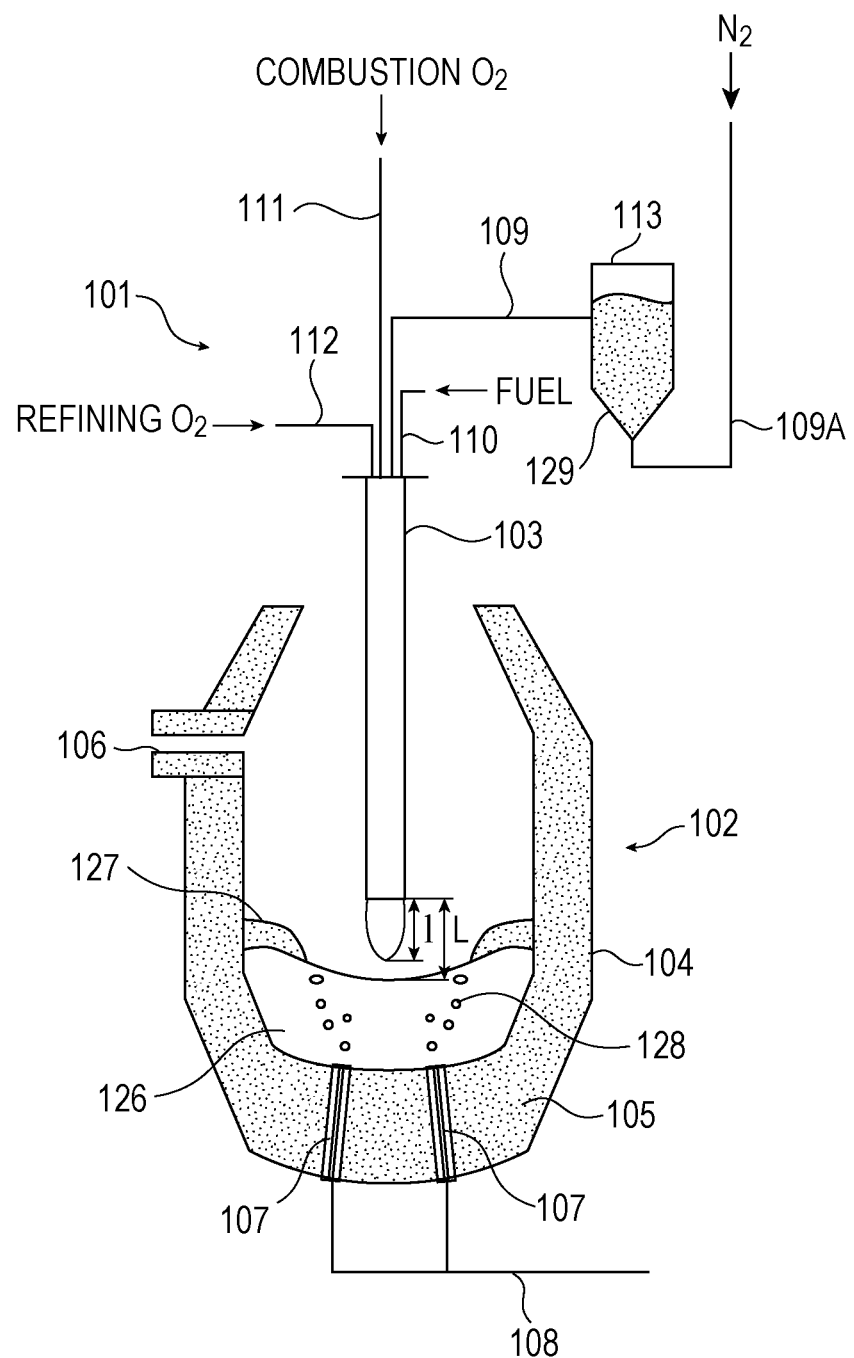
FIG. 4 is a schematic cross-sectional view of a converter facility used in a second example.

FIG. 4 is a schematic cross-sectional view of a converter facility. As illustrated in FIG. 4, a converter facility 101 includes a furnace main body 102 and a top-blowing lance 103, which can be inserted in the furnace main body 102 and move up and down therein. The furnace main body 102 includes a shell 104. A refractory 105 is disposed inside the shell 104. A tapping hole 106 for pouring out hot metal 126 after dephosphorization is disposed in an upper portion of the furnace main body 102. A plurality of bottom-blowing tuyeres 107 that blow an agitation gas 128 is disposed at the bottom of the furnace main body 102. The bottom-blowing tuyeres 107 are coupled to a gas-inlet pipe 108. Converters have a larger freeboard than hot metal transfer containers such as hot metal ladles and torpedo cars and allow hot metal to be vigorously agitated. Thus, converters have a high ability to melt a cold iron source and allow rapid dephosphorization with a small amount of calcium flux.

The top-blowing lance 103 is coupled to a powdery smelting agent supply pipe 109, a fuel gas supply pipe 110, a combustion oxidizing gas supply pipe 111, a refining oxidizing gas supply pipe 112, and a cooling water supply pipe and drain pipe (not shown) to supply and drain cooling water that cools the top-blowing lance 103. An inert gas such as nitrogen gas or Ar gas and a powdery smelting agent 129 containing at least one of iron oxide, calcium flux, and combustible substances are supplied to the powdery smelting agent supply pipe 109. A gas fuel such as propane gas, liquefied natural gas, or coke-oven gas, is supplied to the fuel gas supply pipe 110. A combustion oxidizing gas such as oxygen gas or air to burn the fuel gas are supplied to the combustion oxidizing gas supply pipe 111. The combustion oxidizing gas is generally oxygen gas. A refining oxidizing gas such as oxygen gas is supplied to the refining oxidizing gas supply pipe 112. The refining oxidizing gas may be oxygen gas (industrial pure oxygen), oxygen-rich air, or a gas mixture of oxygen gas and a noble gas and is generally oxygen gas. In FIG. 4, oxygen gas is supplied as the combustion oxidizing gas and the refining oxidizing gas.

A hydrocarbon liquid fuel such as heavy oil or kerosene may be used instead of the fuel gas. However, a hydrocarbon liquid fuel may cause clogging in a nozzle at a flow path outlet of the top-blowing lance 103. Thus, a fuel gas (gaseous fuel) is preferably used in this example. The use of a gaseous fuel can advantageously prevent clogging in a nozzle, facilitate the supply rate control, and prevent flame off because of its high ignitability.

The other end of the powdery smelting agent supply pipe 109 not coupled to the top-blowing lance 103 is coupled to the dispenser 113 which contains the powdery smelting agent 129. The dispenser 113 is coupled to a powdery smelting agent transport gas supply pipe 109A. An inert gas supplied to the dispenser 113 through the powdery smelting agent transport gas supply pipe 109A functions as a carrier gas for the powdery smelting agent 129 contained in the dispenser 113. The powdery smelting agent 129 in the dispenser 113 is supplied to the top-blowing lance 103 through the powdery smelting agent supply pipe 109 and is blown over the hot metal 126 through the tip of the top-blowing lance 103. In FIG. 4, nitrogen gas is supplied to the top-blowing lance 103 as a carrier gas for the powdery smelting agent 129.

Figure 5:
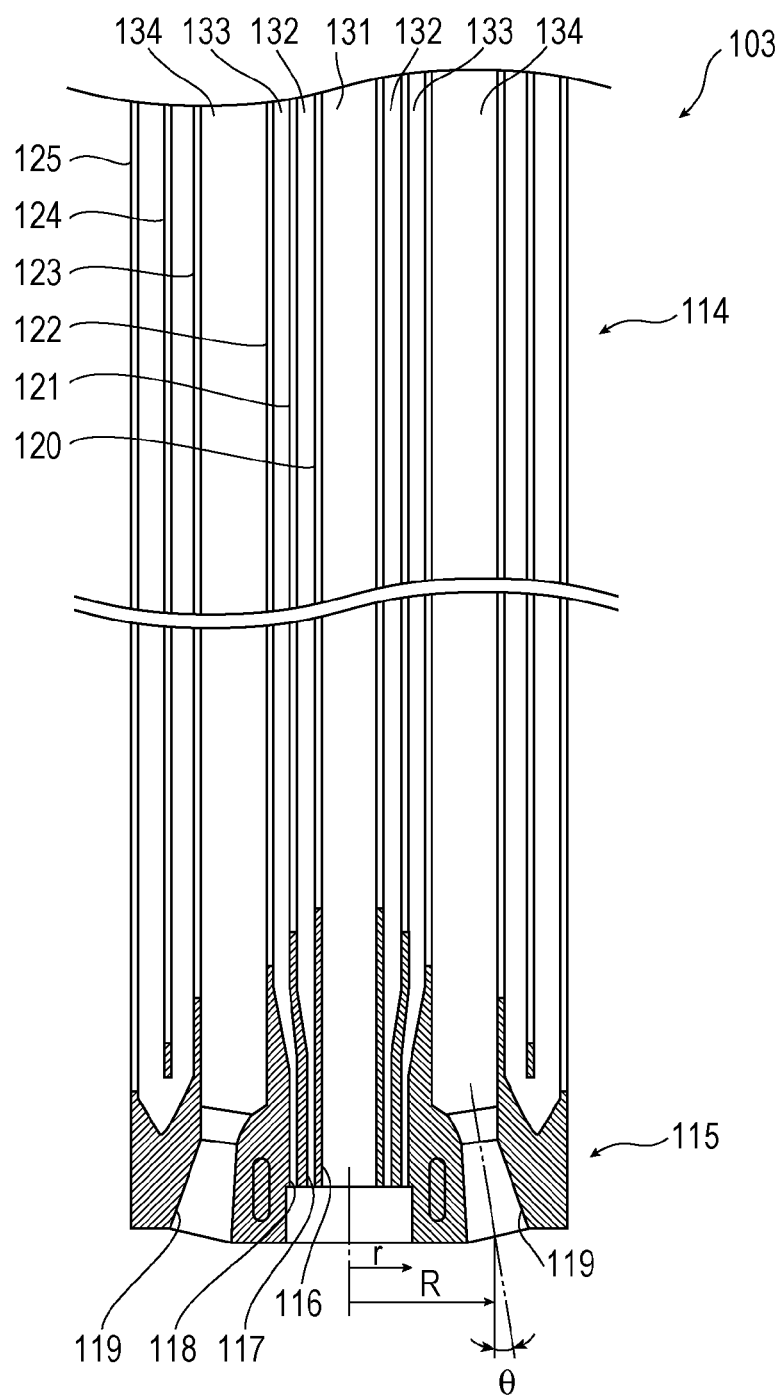
FIG. 5 is a schematic enlarged longitudinal sectional view of a top-blowing lance used in the second example.

FIG. 5 is a schematic cross-sectional view of a top-blowing lance. As illustrated in FIG. 5, the top-blowing lance 103 includes a cylindrical lance main body 114 and a copper casting lance chip 115 joined, for example, by welding, to the lower end of the lance main body 114. The lance main body 114 is constructed of concentric circular six steel tubes, that is, a sextuple tube, including an innermost tube 120, a partition tube 121, an inner tube 122, a middle tube 123, an outer tube 124, and an outermost tube 125.

The powdery smelting agent supply pipe 109 is in communication with the innermost tube 120. The powdery smelting agent 129, together with a carrier gas, passes through the innermost tube 120. The fuel gas supply pipe 110 is in communication with the partition tube 121. A fuel gas such as propane gas passes through a gap between the innermost tube 120 and the partition tube 121. The combustion oxidizing gas supply pipe 111 is in communication with the inner tube 122. A fuel combustion oxidizing gas passes through a gap between the partition tube 121 and the inner tube 122. The refining oxidizing gas supply pipe 112 is in communication with the middle tube 123. A refining oxidizing gas passes through a gap between the inner tube 122 and the middle tube 123. The cooling water supply pipe and the drain pipe are in communication with the outer tube 124 or the outermost tube 125. A cooling water passes through a gap between the middle tube 123 and the outer tube 124 and a gap between the outer tube 124 and the outermost tube 125. Although a cooling water passes through a gap between the middle tube 123 and the outer tube 124 and a gap between the outer tube 124 and the outermost tube 125, either path may be a water supply path. The paths are constructed such that the cooling water returns at the lance chip 115.

The interior of the innermost tube 120 is in communication with a central hole 116 disposed approximately at the position of central axis of the lance chip 115. The space between the innermost tube 120 and the partition tube 121 is in communication with a fuel gas nozzle 117 composed of an annular nozzle or a plurality of nozzle orifices on a concentric circle around the central hole 116. The space between the partition tube 121 and the inner tube 122 is in communication with a combustion oxidizing gas nozzle 118 composed of an annular nozzle or a plurality of nozzle orifices on a concentric circle around the fuel gas nozzle 117. The space between the inner tube 122 and the middle tube 123 is in communication with a plurality of surrounding holes 119 around the combustion oxidizing gas nozzle 118. The central hole 116 is a nozzle to blow the powdery smelting agent 129 together with a carrier gas. The fuel gas nozzle 117 is a nozzle to eject a fuel gas. The combustion oxidizing gas nozzle 118 is a nozzle to eject an oxidizing gas for the combustion of the fuel gas. The surrounding holes 119 are nozzles to blow a refining oxidizing gas. In other words, the interior of the innermost tube 120 serves as a powdery smelting agent supply path 131. The space between the innermost tube 120 and the partition tube 121 serves as a fuel gas supply path 132. The space between the partition tube 121 and the inner tube 122 serves as a combustion oxidizing gas supply path 133. The space between the inner tube 122 and the middle tube 123 serves as a refining oxidizing gas supply path 134. The space between the middle tube 123 and the outer tube 124 and the space between the outer tube 124 and the outermost tube 125 serve as a water supply path or a drain path to cool water. Thus, the top-blowing lance 103 includes the powdery smelting agent supply path 131, the fuel gas supply path 132, the combustion oxidizing gas supply path 133, and the refining oxidizing gas supply path 134 separately, and further includes the water supply path and drain path to cool water.

The central hole 116 is a straight nozzle. The surrounding holes 119 are Laval nozzles composed of two cones having a decreasing cross section and an increasing cross section. The central hole 116 may also be a Laval nozzle. The fuel gas nozzle 117 and the combustion oxidizing gas nozzle 118 are straight nozzles having an annular slit or straight nozzles having a circular cross section. In a Laval nozzle, the smallest cross section between two cones having a decreasing cross section and an increasing cross section is referred to as a throat.

To increase the blend ratio of a cold iron source using the converter facility 101, dephosphorization of the hot metal 126 is performed as described below.

First, the furnace main body 102 is charged with a cold iron source. The cold iron source may be scrap iron such as crop scraps of cast billets, cast blooms or steel sheets produced in ironworks or domestic wastes, iron magnetically collected from slag and, further, cold pig iron or reduced iron. The blend ratio of the cold iron source is preferably 5% by mass or more of the total iron source (the blend ratio of the cold iron source (mass %)=the amount of cold iron source×100/(the amount of hot metal+the amount of cold iron source)). When the blend ratio of the cold iron source is less than 5% by mass, this results in an insignificant improvement in productivity and an insignificant reduction in $CO_2$ emission. The maximum blend ratio of the cold iron source is not particularly limited, provided that the temperature of the hot metal after preliminary dephosphorization is in a desired range. When the cold iron source is almost completely charged, the agitation gas 128 begins to be blown through the bottom-blowing tuyeres 107.

The furnace main body 102 is charged with the cold iron source and then with the hot metal 126. The hot metal 126 may have any composition. Preliminary dephosphorization may be preceded by desulfurization or desiliconization. The hot metal 126 before preliminary dephosphorization is mainly composed of carbon: 3.8% to 5.0% by mass, silicon: 0.3% by mass or less, phosphorus: 0.08% to 0.2% by mass, and sulfur: 0.05% by mass or less, approximately. A large amount of slag 127 produced in the furnace main body during preliminary dephosphorization results in low dephosphorization efficiency. Thus, to reduce the amount of slag in the furnace to improve dephosphorization efficiency, silicon in the hot metal is preferably removed before preliminary dephosphorization ("desiliconization of hot metal") such that the silicon concentration of the hot metal is 0.20% by mass or less, more preferably 0.10% by mass or less. Dephosphorization can be performed without problems when the temperature of hot metal ranges from 1200° C. to 1400° C. In the case when desiliconization is performed, slag produced during desiliconization is removed before dephosphorization.

An inert gas is then supplied to the dispenser 113, and the powdery smelting agent 129, together with the inert gas, is blown over the bath surface of the hot metal 126 through the central hole 116 of the top-blowing lance 103. Almost simultaneously with the blowing of the powdery smelting agent 129, a fuel gas is ejected through the fuel gas nozzle 117 of the top-blowing lance 103, and an oxidizing gas such as oxygen gas is ejected through the combustion oxidizing gas nozzle 118. A flame is formed downwardly in front of the nozzle of the top-blowing lance 103 toward the bath surface of the hot metal 126.

When a flame is formed at the tip of the top-blowing lance 103, the amounts of fuel gas and combustion oxidizing gas supplied to the top-blowing lance 103 or the flow ratio of the combustion oxidizing gas to the fuel gas is controlled to satisfy the following formula (1) such that the ratio (l/L) of the flame length l to the top-blowing lance height L is 0.8 or more and 1.2 or less, thereby completely burning the fuel gas in the freeboard of the converter.

$$0.4 \leq (G/F)/(G/F)_{st} \leq 1.0 \quad (1)$$

G denotes the combustion oxidizing gas supply rate (Nm³/min) through the top-blowing lance.

F denotes the fuel gas supply rate (Nm³/min) through the top-blowing lance.

$(G/F)_{st}$ denotes the stoichiometric coefficient ratio of the combustion oxidizing gas required for complete combustion of the fuel gas to the fuel gas.

The top-blowing lance height L refers to the vertical distance from the stationary bath surface of the hot metal 126 to the tip of the nozzle of the top-blowing lance. The assumed value of the top-blowing lance height L is 2.0 to 5.0 m. This is because the value of freeboard of the converter to which the hot metal 126 is charged ranges from approximately 2.0 to 5.0 m. The freeboard refers to the height (distance) from the stationary bath surface of the hot metal 126 to a charging port of a refining container such as a converter.

When $(G/F)/(G/F)_{st}$ is less than 0.4 or more than 1.0, the fuel gas may burn out before the fuel gas reaches the bath surface of the hot metal 126 in the furnace main body 102, or unburned fuel may remain, resulting in low heat deposition efficiency of the powdery smelting agent 129. When $(G/F)/(G/F)_{st}$ is 0.4 or more and 1.0 or less, the ratio (l/L) of the flame length l to the top-blowing lance height L can be set between 0.8 or more and 1.2 or less. The top-blowing lance height L is the distance at which the powdery smelting agent 129 flows from the tip of the top-blowing lance 103 to the bath surface of the hot metal 126 and the flame is generated between the tip of the lance and the bath surface. When the ratio (l/L) of the flame length l to the top-blowing lance height L is close to 1 and is 0.8 or more and 1.2 or less, the fuel consumed by the flame of the top-blowing lance is efficiently consumed to heat the powdery smelting agent 129, and as demonstrated by Experiment 2 described below the flame of the top-blowing lance effectively heats the powdery smelting agent 129, resulting in high heat deposition efficiency.

In addition to the formula (1), the combustion oxidizing gas discharge velocity $V_G$ (Nm/s) is preferably maintained to satisfy the following formula (2):

$$0.2 \leq V_G/C \leq 1.0 \quad (2)$$

where $V_G$ denotes the combustion oxidizing gas discharge velocity (Nm/s), and

C denotes the speed of sound (Nm/s).

A $V_G/C$ value of less than 0.2 results in a poorly mixed state of the fuel gas and the combustion oxidizing gas and tends to result in incomplete combustion of the fuel gas in the space between the bath surface of the hot metal 126 and the tip of the top-blowing lance 103. A $V_G/C$ value of more than 1.0 tends to result in burnout of the fuel gas before the fuel gas reaches the bath surface of the hot metal 126 and low heat deposition efficiency of the powdery smelting agent 129. This tends to result in low heat deposition efficiency of the hot metal (molten iron) and a low blend ratio of the cold iron source such as scrap iron.

When the fuel gas and the combustion oxidizing gas are supplied to the top-blowing lance 103 under the conditions that satisfy formula (1), the fuel gas from the fuel gas nozzle 117 is adjacent to the combustion oxidizing gas from the combustion oxidizing gas nozzle 118 in all radial directions of the top-blowing lance 103 so that the fuel gas and the combustion oxidizing gas interfere with each other. Thus, also because of a high ambient temperature, when the gas concentrations of the fuel gas and the combustion oxidizing gas reach in the range of their flammability limits, the gases burn and form a flame under the top-blowing lance 103 without an igniter.

An experiment was performed on the possibility of adjusting the flame length to the lance height by supplying a fuel gas and a combustion oxidizing gas and controlling the amount of combustion oxidizing gas to be supplied to satisfy formula (1).

<Experiment 1>

By using the converter facility 101 illustrated in FIG. 4, the flame length was investigated in the case where the amount of supplied combustion oxidizing gas was altered. The furnace main body 102 of the converter facility 101 can contain 350 tons of molten iron. The furnace main body 102 was charged with 300 tons of molten iron. The top-blowing lance 103 was disposed at a position at a top-blowing lance height L being 2.0 to 5.0 m. A plurality of lance main bodies 114 having the same dimensions were prepared and were provided with lance chips 115 of different designs. The fuel gas and the fuel gas combustion oxidizing gas were supplied to the top-blowing lance 103 to form a flame at the lower end of the top-blowing lance 103.

The lance chips 115 had a central hole having an inner diameter of 55 mm, a fuel gas nozzle having an annular slit gap of 6.5 mm, and surrounding holes being a five-hole Laval nozzle each of the holes having a throat size of 50 mm disposed at an angle of 15 degrees with respect to the central axis of the lance. The lance chips 115 had the combustion oxidizing gas nozzles 118 of different designs. The combustion oxidizing gas nozzles 118 were annular slit gaps. The lance chips 115 had different given dimensions of the annular slit gaps of 16.4 to 25.4 mm.

Each of the lance chips 115 was welded to the corresponding lance main body 114 to assemble the top-blowing lances 103 including the combustion oxidizing gas nozzles 118 having different gaps. Thus, in forming of a flame, the ejection speed (discharge speed (Nm/s)) of the combustion oxidizing gas could be altered even when the combustion oxidizing gas flow rate ($Nm^3/s$) was fixed.

The fuel gas was propane gas (calorific value: 100.5 $MJ/Nm^3$). The supply flow rate (supply rate) F of the propane gas was 12 $Nm^3/min$. The fuel gas combustion oxidizing gas and the refining oxidizing gas were oxygen gas. The supply flow rate (supply rate) G of the fuel gas combustion oxidizing gas was 0 to 75 $Nm^3/min$. The supply flow rate of the refining oxidizing gas was 485 to 560 $Nm^3/min$. The total oxygen supply flow rate to the furnace main body 102 was kept constant and 560 $Nm^3/min$ in each run. The stoichiometric coefficient ratio $(G/F)_{st}$ of the combustion oxidizing gas required for complete combustion of the propane gas to the propane gas was 5.0.

Figure 6:
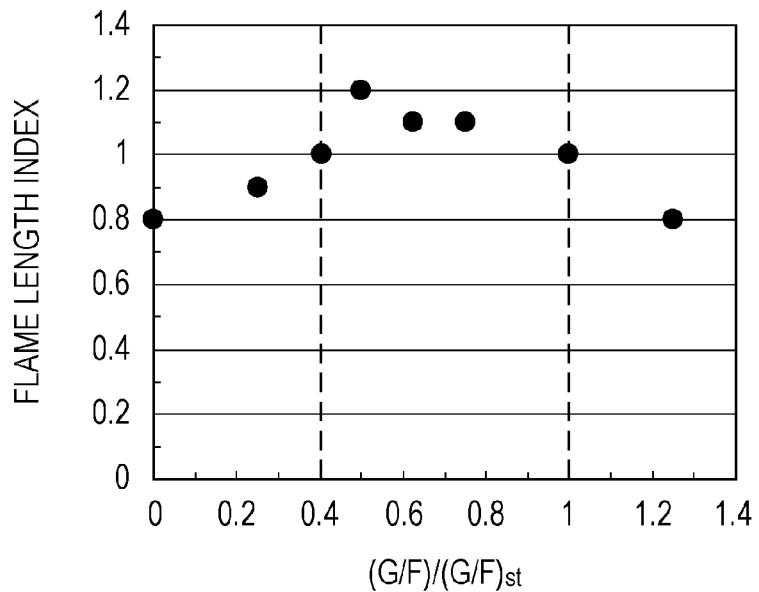
FIG. 6 is a graph of the relationship between the flow ratio of a combustion oxygen gas to propane gas and the flame length index in the second example.

After one of the top-blowing lances 103 was selected, the fuel gas and the combustion oxidizing gas were blown through the selected top-blowing lance 103 to form a stable flame. The flame length was visually measured under various conditions. FIG. 6 shows the measurement results for the top-blowing lance height L of 2.5 m. The "flame length index" on the vertical axis in FIG. 6 refers to the ratio "$l/l_{st}$" of the visually measured flame length l from the tip of the top-blowing lance 103 to the tip of the flame to the visually measured flame length $l_{st}$ at the stoichiometric ratio. "$(G/F)/(G/F)_{st}$" on the horizontal axis in FIG. 6 refers to the flow ratio of the combustion oxidizing gas to the propane gas relative to $(G/F)_{st}$.

FIG. 6 shows that the flame length could be changed by altering the amount of combustion oxidizing gas to be supplied. Thus, the appropriate flame length l adjusted to the top-blowing lance height L could be formed by altering the amount of combustion oxidizing gas to be supplied.

Next, the heat deposition behavior on hot metal was studied by altering the top-blowing lance height L under the condition of the theoretical combustion ratio "$(G/F)/(G/F)_{st}=1$" in Experiment 1 (Experiment 2).

<Experiment 2>

In the case that the theoretical combustion ratio was one, the fuel gas and the fuel gas combustion oxidizing gas were supplied to the top-blowing lance 103 to form a flame at the lower end of the top-blowing lance 103 in the same manner as in Experiment 1 except for the theoretical combustion ratio "$(G/F)/(G/F)_{st}=1$". The powdery smelting agent was heated. The amounts of heat deposited on molten iron at different top-blowing lance heights L were calculated from the increase in temperature of the molten iron.

Figure 7:
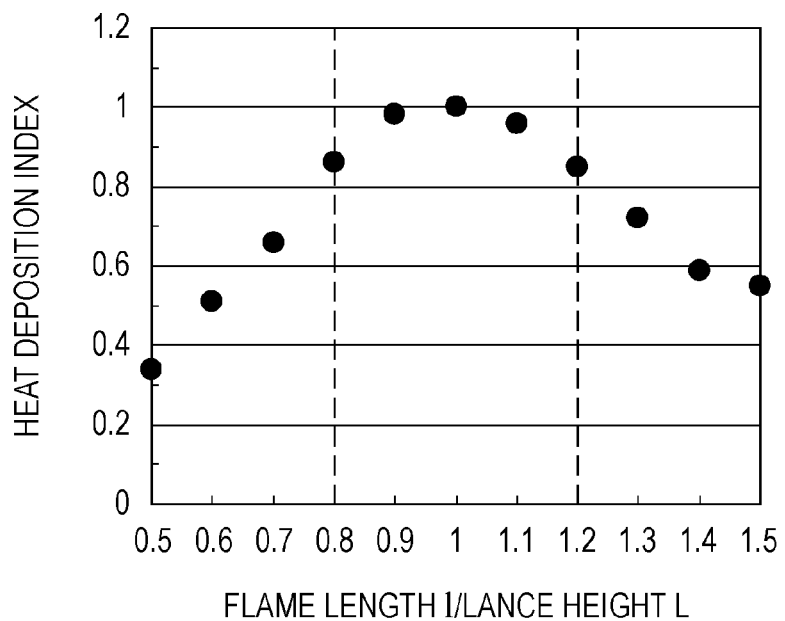
FIG. 7 is a graph of the relationship between the ratio (l/L) of the flame length l to the lance height L and the heat deposition index according to the second example. The heat deposition index is the ratio of deposited heat at each ratio (l/L) to deposited heat at a ratio (l/L)=1 at which the flame length l is equal to the lance height L.

FIG. 7 illustrates the relationship between the ratio (l/L) of the flame length l to the lance height L and the heat deposition index. The heat deposition index is the ratio of deposited heat at each ratio (l/L) to deposited heat at a ratio (l/L)=1 at which the flame length l is equal to the lance height L. Deposition of heat on hot metal from the powdery smelting agent heated with the flame is assumed to be efficient when the heat deposition index is more than 0.8. From FIG. 7, it is confirmed that such efficient deposition of heat was achieved at (l/L) 0.8 to 1.2. The powdery smelting agent 129 ejected from the central hole 116 together with the inert gas is heated or heated and melted with the heat of the flame, and the heated or melted powdery smelting agent 129 is blown to the bath surface of the hot metal 126. The heat of the powdery smelting agent 129 is deposited on the hot metal 126 and increases the temperature of the hot metal 126, thereby promoting the melt of the added cold iron source. The powdery smelting agent 129 preferably contains at least one of iron oxide, calcium flux, and combustible substances.

Further, at the same time, the refining oxidizing gas, such as oxygen gas is blown over the bath surface of the hot metal 126 through the surrounding holes 119 of the top-blowing lance 103. The dephosphorization reaction of the hot metal 126 proceeds, as phosphorus in the hot metal reacts with the oxidizing gas or iron oxide to form a phosphorus oxide ($P_2O_5$), and the phosphorus oxide is absorbed in the slag 127 formed by the slagging of calcium flux. The dephosphorization rate increases with the acceleration of slagging of calcium flux. Thus, the powdery smelting agent 129 is preferably calcium flux such as calcium oxide (CaO), limestone ($CaCO_3$), or hydrated lime ($Ca(OH)_2$). A mixture of calcium oxide and a slagging accelerator such as fluorite ($CaF_2$) or alumina ($Al_2O_3$) may be used as calcium flux. Converter slag ($CaO$—$SiO_2$ slag) produced in a decarburization blowing process of the hot metal 126 may be entirely or partly used as calcium flux.

Calcium flux blown over the bath surface of the hot metal 126 as the powdery smelting agent 129 immediately forms slag 127. The refining oxidizing gas supplied reacts with phosphorus in the hot metal to form phosphorus oxide. While the hot metal 126 and the slag 127 are vigorously agitated with the agitation gas 128, the generated phosphorus oxide is rapidly absorbed into the slag 127. Thus, the dephosphorization reaction of the hot metal 126 proceeds rapidly. When the powdery smelting agent 129 contains no calcium flux, calcium flux is separately charged from a hopper at an upper portion of the furnace.

When the powdery smelting agent 129 contains iron oxide such as iron ore or mill scale, the iron oxide serves as an oxygen source and reacts with phosphorus in the molten steel, thereby promoting the dephosphorization reaction. Further, the iron oxide reacts with calcium flux to form a FeO—CaO compound on the surface of the calcium flux, thereby promoting the slagging of the calcium flux and the dephosphorization reaction. When iron oxide containing a combustible substance such as blast furnace dust or converter dust, is used, the combustible substance burns with the flame, and the combustion of the combustible substance also heats the hot metal 126.

When the powdery smelting agent 129 contains a combustible substance such as aluminum dross (Al oxide containing 30 to 50 mass % metallic Al produced by a reaction between Al and oxygen in the air when an ingot or scrap of Al is melted in a melting furnace) or coke, the combustible substance burns with the flame, and the combustion heat of the combustible substance contribute to heating the hot metal 126 in addition to the combustion heat of the fuel. When a mixture of calcium flux, iron oxide and a combustible substance is used as the powdery smelting agent 129, their respective effects can be obtained.

The heat of the powdery smelting agent 129 heated or heated and melted with the flame formed from the top-blowing lance 103 is transferred to the hot metal 126. The heat of combustion of the flame at the tip of the top-blowing lance above the hot metal 126 is also transferred to the hot metal 126. The heat transferred to the hot metal 126, along with vigorous agitation of the hot metal 126 promotes the melt of the cold iron source in the hot metal. The cold iron source is completely melted during the dephosphorization.

When the phosphorus concentration of the hot metal 126 reaches its target value or less, all the supplies from the top-blowing lance 103 to the hot metal 126 are stopped and the dephosphorization is completed. After the dephosphorization, the furnace main body 102 is tilted to pour the hot metal 126 which has subjected to preliminary dephosphorization into a hot metal container such as a ladle or a converter charging ladle through the tapping hole 106, and the tapped hot metal 126 is transported to a facility in the next process.

As described above, the amounts of fuel gas and oxygen gas to be supplied to form a burner flame at the tip of a top-blowing lance can be appropriately controlled to adjust the flame length corresponding to any one of various lance heights. As a result, the powdery smelting agent 129 supplied to the furnace main body 102 through the top-blowing lance 103 can be continuously and consistently heated before reaching the bath surface of the hot metal 126. The heat of the powdery smelting agent 129 is securely deposited on the hot metal 126 and improves the heat margin of the hot metal 126. This can achieve great increase in the blend ratio of a cold iron source such as scrap iron, in the oxidation refining of the hot metal 126 in the converter facility 101.

Example 2

A converter facility 101 and a top-blowing lance 103 having the same dimensions as in Experiments 1 and 2 were used. The converter facility 101 was charged with hot metal and scrap iron. The top-blowing lance 103 was inserted into a furnace main body 102 at a lance height of 2.5 m, and then dephosphorization blowing (preliminary dephosphorization of hot metal) was performed. In the same manner as in the Experiments described above, propane gas was supplied to the top-blowing lance 103 as a fuel, and oxygen gas was supplied to the top-blowing lance 103 as a combustion oxidizing gas and a refining oxidizing gas. The top-blowing lance 103 had a central hole having an inner diameter of 55 mm, a fuel gas nozzle having an annular slit gap of 6.5 mm, a combustion oxidizing gas nozzle having an annular slit gap of 16.4 to 25.4 mm, and surrounding holes of a five-hole Laval nozzle each hole having a throat size of 50 mm disposed at an angle of 15 degrees with respect to the central axis of the lance. The discharge velocity could be altered by changing the annular slit gap even at a constant supply rate. In dephosphorization blowing, the combustion oxidizing gas was supplied to the converter facility 101 such that the ratio (l/L) of the flame length l to the top-blowing lance height L was 0.8 or more and 1.2 or less and such that the flow ratio (G/F) of the supply rate ($Nm^3$/min) of the combustion oxidizing gas supplied through the combustion oxidizing gas supply path to the supply rate ($Nm^3$/min) of the propane gas supplied through the fuel gas supply path was 0.4 to 1.0 times the stoichiometric coefficient ratio $(G/F)_{st}$ of the combustion oxidizing gas required for complete combustion of the fuel gas to the fuel gas (Examples 21 to 25). For comparison purposes, the amount of supplied combustion oxidizing gas was decreased to less than 40% or increased to more than 100% of the amount of combustion oxidizing gas required for complete combustion of the fuel gas such that the value of $(G/F)/(G/F)_{st}$ was outside 0.4 to 1.0 (Comparative Examples 21 and 22). In Examples 22 and 23, the discharge velocity $V_G$ (Nm/s) of the combustion oxidizing gas was adjusted and the fuel gas combustion oxidizing gas was supplied such that $V_G/C$ was 0.2 to 1.0. In Examples 24 and 25, $V_G/C$ was outside 0.2 to 1.0. C denotes the speed of sound (Nm/s) and is approximately 1150 m/s in the vicinity of the hot metal having a temperature of 1350° C.

A furnace main body 202 was charged with scrap iron such that no scrap iron remained unmelted after dephosphorization and was then charged with 300 tons of hot metal having a temperature of 1350° C. A mixed powder of calcium oxide, iron ore, and steel production dust, the fuel gas, the combustion oxidizing gas, and the refining oxidizing gas were then blown to the hot metal surface through the top-blowing lance 203 while argon gas was blown into the hot metal as an agitation gas through the bottom-blowing tuyere 7.

The amount of scrap iron was adjusted such that the preliminary dephosphorization finish temperature was 1400° C. The amount of calcium oxide was adjusted such that the basicity (mass % CaO/mass % $SiO_2$) of furnace slag was 2.5.

Table 6 shows the composition of the hot metal used in the preliminary dephosphorization.

TABLE 6

| Chemical composition of hot metal (mass %) | | | | | |
|---|---|---|---|---|---|
| C | Si | Mn | P | S | Cr |
| 4.4 | 0.20 | 0.21 | 0.120 | 0.011 | tr |

Table 7 shows the composition of the steel production dust.

TABLE 7

| Chemical composition of steel production dust (mass %) | | | | | | |
|---|---|---|---|---|---|---|
| T. Fe | M. Fe | C | CaO | $SiO_2$ | $Al_2O_3$ | MgO |
| 77.0 | 61.4 | 1.1 | 4.9 | 1.9 | 0.3 | 2.0 |

The powdery smelting agent blowing rate, the flow rates of various gases flowing through the top-blowing lance, the bottom-blown gas flow rate, and the flame length in the preliminary dephosphorization were set as shown in Table 8. The amount of fuel gas combustion oxidizing gas to be supplied was adjusted and resultant values of $(G/F)/(G/F)_{st}$ and $V_G/C$ are shown in Table 8.

TABLE 8

| | Top-blowing lance | | | | | | | | | Bottom blowing |
|---|---|---|---|---|---|---|---|---|---|---|
| | Calcium oxide | Iron ore | Steel production dust | Propane gas F | Combustion oxidizing gas G | Refining oxidizing gas | $(G/F)/(G/F)_{st}$ | $V_G/C$ | Flame length | Argon gas |
| | kg/min/hot metal ton | | | | $Nm^3$/min/hot metal ton | | — | — | m | $Nm^3$/min/hot metal ton |
| Example 21 | 2.0 | 0.4 | 0.6 | 0.1 | 0.35 | 2.15 | 0.7 | 0.5 | 2.4 | 0.1 |
| Example 22 | 2.0 | 0.4 | 0.6 | 0.1 | 0.2 | 2.3 | 0.4 | 0.2 | 2.7 | 0.1 |
| Example 23 | 2.0 | 0.4 | 0.6 | 0.1 | 0.5 | 2.0 | 1.0 | 0.5 | 2.1 | 0.1 |

TABLE 8-continued

|  | Top-blowing lance | | | | | | | | | Bottom blowing |
| --- | --- | --- | --- | --- | --- | --- | --- | --- | --- | --- |
|  | Calcium oxide | Iron ore | Steel production dust | Propane gas F | Combustion oxidizing gas G | Refining oxidizing gas | $(G/F)/$ $(G/F)_{st}$ | $V_G/C$ | Flame length | Argon gas $Nm^3/min/hot$ metal ton |
|  | kg/min/hot metal ton | | | | $Nm^3/min/hot$ metal ton | | — | — | m | |
| Example 24 | 2.0 | 0.4 | 0.6 | 0.1 | 0.2 | 2.3 | 0.4 | 0.1 | 3.0 | 0.1 |
| Example 25 | 2.0 | 0.4 | 0.6 | 0.1 | 0.5 | 2.0 | 1.0 | 1.1 | 1.9 | 0.1 |
| Comparative Example 21 | 2.0 | 0.4 | 0.6 | 0.1 | 0.15 | 2.35 | 0.3 | 0.5 | 3.4 | 0.1 |
| Comparative Example 22 | 2.0 | 0.4 | 0.6 | 0.1 | 0.6 | 1.9 | 1.2 | 0.2 | 1.6 | 0.1 |

Table 9 shows the preliminary dephosphorization results obtained using the operation method under the operation conditions described above. The scrap iron blend ratio was altered variously and Table 9 shows the highest scrap iron blend ratio at which no scrap iron remained unmelted after dephosphorization.

TABLE 9

|  | Blowing time min | Scrap iron blend ratio % |
| --- | --- | --- |
| Example 21 | 8.0 | 6.0 |
| Example 22 |  | 6.4 |
| Example 23 |  | 6.4 |
| Example 24 |  | 5.5 |
| Example 25 |  | 5.5 |
| Comparative Example 21 |  | 2.3 |
| Comparative Example 22 |  | 2.2 |

As is clear from Table 9, a comparison of Examples 21 to 25 with Comparative Examples 21 and 22 with respect to the blowing time and the scrap iron blend ratio shows that our methods allow operation at a higher scrap iron blend ratio even when the blowing time for preliminary dephosphorization of hot metal is fixed to 8 minutes. Thus, we can provide efficient preliminary dephosphorization of hot metal.

Examples 21 to 23, which satisfied $V_G/C$ of 0.2 or more and 1.0 or less, allow operation at a higher scrap iron blend ratio than Examples 24 and 25, which had $V_G/C$ outside this range. Thus, more efficient preliminary dephosphorization of hot metal can be performed at $V_G/C$ of 0.2 or more and 1.0 or less.

Third Example

Our methods are directed to oxidation refining performed by supplying a refining oxidizing gas to molten iron in a reaction vessel having a small freeboard, such as a torpedo car, a hot-metal ladle, or an electric furnace, through a top-blowing lance. Such oxidation refining presently includes dephosphorization of hot metal and molten steel and decarburization refining of hot metal, and our method can be applied to any of these oxidation refining treatments. In the context of decarburization refining of hot metal, our methods may be applied to either hot metal subjected to dephosphorization or hot metal not subjected to dephosphorization. Our methods may be applied to dephosphorization of hot metal, and the hot metal refined by the dephosphorization can be subjected to decarburization refining in a reaction vessel.

We provide methods of refining molten iron through oxidation refining in a reaction vessel. In the following examples, hot metal produced in a blast furnace is used as typical molten iron. Our methods will be more specifically described with respect to dephosphorization of such hot metal in a reaction vessel with reference to the accompanying drawings.

Figure 8:
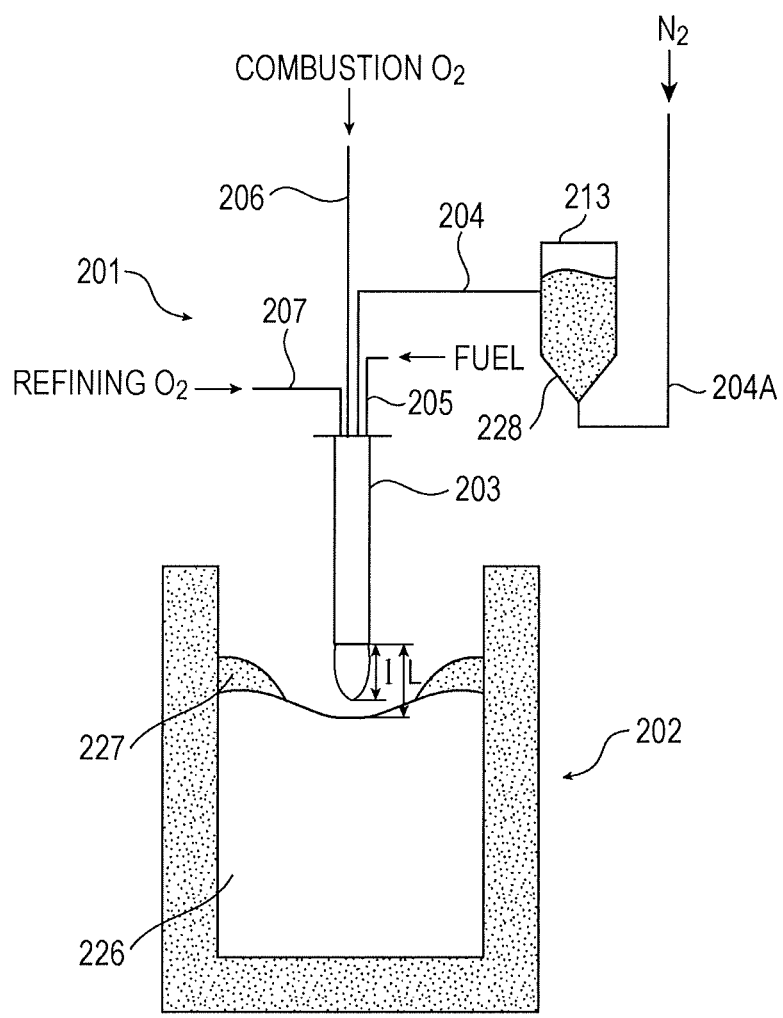
FIG. 8 is a schematic cross-sectional view of a smelting facility used in a third example.

FIG. 8 is a schematic cross-sectional view of a smelting facility. As illustrated in FIG. 8, a smelting facility 201 includes a reaction vessel 202 and a top-blowing lance 203, which can be inserted in the reaction vessel 202 and move up and down therein. A refractory is disposed inside the reaction vessel 202. The top-blowing lance 203 is coupled to a powdery smelting agent supply pipe 204, a fuel gas supply pipe 205, a combustion oxidizing gas supply pipe 206, a refining oxidizing gas supply pipe 207, and a cooling water supply pipe and drain pipe (not shown) to supply and draining cooling water to cool the top-blowing lance 203. Together with an inert gas such as nitrogen gas or Ar gas, a powdery smelting agent 228 containing at least one of iron oxide, calcium flux, and combustible substances are supplied to the powdery smelting agent supply pipe 204. A gas fuel such as propane gas, liquefied natural gas, or coke-oven gas, is supplied to the fuel gas supply pipe 205. A combustion oxidizing gas such as oxygen gas or air to burn the fuel gas is supplied to the combustion oxidizing gas supply pipe 206. As the combustion oxidizing gas, oxygen gas is generally used. A refining oxidizing gas such as oxygen gas is supplied to the refining oxidizing gas supply pipe 207. As the refining oxidizing gas oxygen gas (industrial pure oxygen), oxygen-rich air or a gas mixture of oxygen gas and a noble gas may be used and oxygen gas is generally used. In FIG. 8, the combustion oxidizing gas and the refining oxidizing gas are oxygen gas.

A hydrocarbon liquid fuel such as heavy oil or kerosene may be used instead of the fuel gas. However, a hydrocarbon liquid fuel may cause clogging in a nozzle at a flow path outlet of the top-blowing lance 203. Thus, a fuel gas (gaseous fuel) is preferably used in this example. The use of a gaseous fuel can advantageously prevent clogging in a nozzle, facilitate the supply rate control, and prevent flame off because of its high ignitability.

The other end of the powdery smelting agent supply pipe 204 not coupled to the top-blowing lance 203 is coupled to the dispenser 213, which contains the powdery smelting agent 228. The dispenser 213 is coupled to a powdery smelting agent transport gas supply pipe 204A. An inert gas supplied to the dispenser 213 through the powdery smelting agent transport gas supply pipe 204A functions as a carrier gas for the powdery smelting agent 228 in the dispenser 213. The powdery smelting agent 228 in the dispenser 213 is supplied to the top-blowing lance 203 through the powdery smelting agent supply pipe 204 and is blown over the hot metal 226 through the tip of the top-blowing lance 203. In FIG. 8, nitrogen gas is supplied to the top-blowing lance 203 as a carrier gas for the powdery smelting agent 228.

Figure 9:
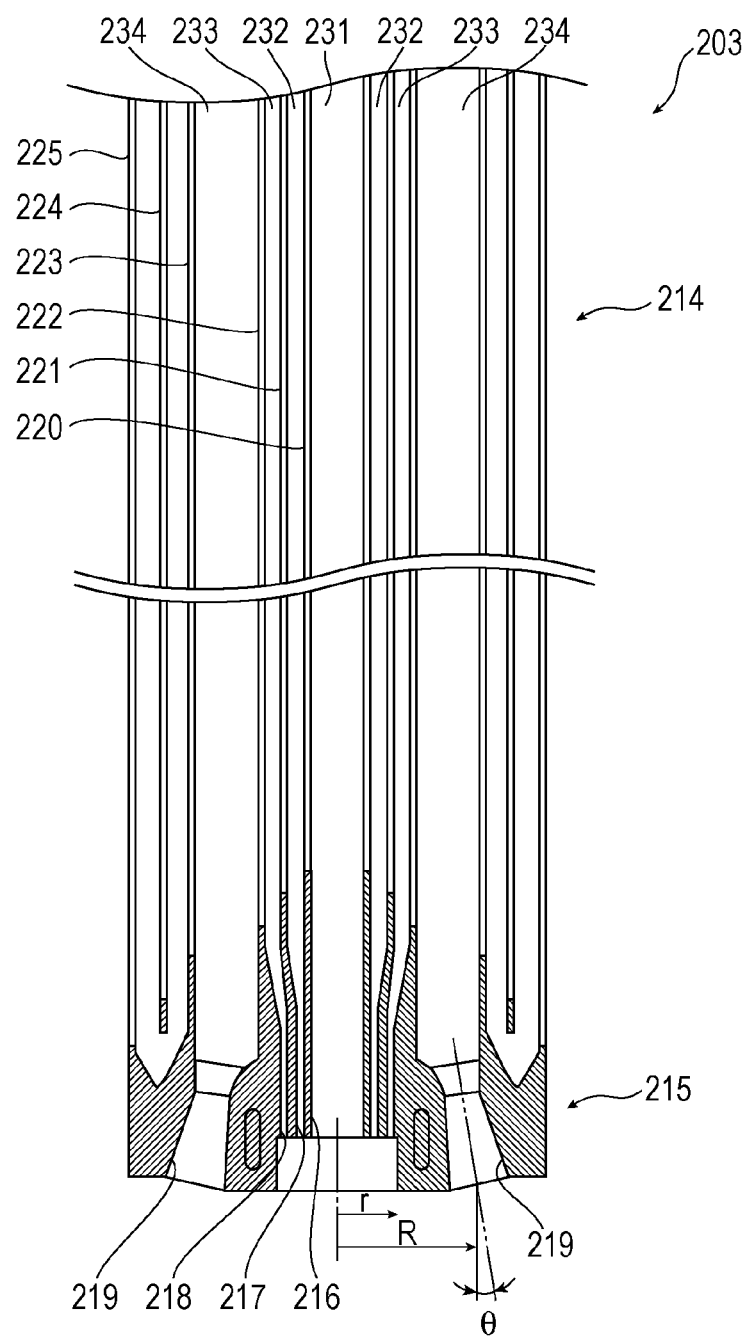
FIG. 9 is a schematic enlarged longitudinal sectional view of a top-blowing lance used in the third example.

FIG. 9 is a schematic cross-sectional view of a top-blowing lance. As illustrated in FIG. 9, the top-blowing lance 203 includes a cylindrical lance main body 214 and a copper casting lance chip 215 joined, for example, by welding, to the lower end of the lance main body 214. The lance main body 214 is composed of concentric circular six steel tubes, that is, a sextuple tube, including an innermost tube 220, a partition tube 221, an inner tube 222, a middle tube 223, an outer tube 224, and an outermost tube 225.

The powdery smelting agent supply pipe 204 is in communication with the innermost tube 220. The powdery smelting agent 228, together with a carrier gas, passes through the interior of the innermost tube 220. The fuel gas supply pipe 205 is in communication with the partition tube 221. A fuel gas such as propane gas passes through a gap between the innermost tube 220 and the partition tube 221. The combustion oxidizing gas supply pipe 206 is in communication with the inner tube 222. A fuel combustion oxidizing gas passes through a gap between the partition tube 221 and the inner tube 222. The refining oxidizing gas supply pipe 207 is in communication with the middle tube 223. A refining oxidizing gas passes through a gap between the inner tube 222 and the middle tube 223. The cooling water supply pipe and the drain pipe are in communication with the outer tube 224 or the outermost tube 225. A cooling water passes through a gap between the middle tube 223 and the outer tube 224 and a gap between the outer tube 224 and the outermost tube 225. Although the cooling water passes through a gap between the middle tube 223 and the outer tube 224 and a gap between the outer tube 224 and the outermost tube 225, either path may be a water supply path. The paths are constructed such that the cooling water returns at the lance chip 215.

The interior of the innermost tube 220 is in communication with a central hole 216 disposed approximately at the position of the central axis of the lance chip 215. The space between the innermost tube 220 and the partition tube 221 is in communication with a fuel gas nozzle 217 composed of an annular nozzle or a plurality of nozzle orifices on a concentric circle around the central hole 216. The space between the partition tube 221 and the inner tube 222 is in communication with a combustion oxidizing gas nozzle 218 composed of an annular nozzle or a plurality of nozzle orifices on a concentric circle around the fuel gas nozzle 217. The space between the inner tube 222 and the middle tube 223 is in communication with a plurality of surrounding holes 219 around the combustion oxidizing gas nozzle 218. The central hole 216 is a nozzle to blow the powdery smelting agent 228 together with a carrier gas. The fuel gas nozzle 217 is a nozzle to eject a fuel gas. The combustion oxidizing gas nozzle 218 is a nozzle to eject an oxidizing gas for the combustion of the fuel gas. The surrounding holes 219 are nozzles to blow a refining oxidizing gas. In other words, the interior of the innermost tube 220 serves as a powdery smelting agent supply path 231. The space between the innermost tube 220 and the partition tube 221 serves as a fuel gas supply path 232. The space between the partition tube 221 and the inner tube 222 serves as a combustion oxidizing gas supply path 233. The space between the inner tube 222 and the middle tube 223 serves as a refining oxidizing gas supply path 234. The space between the middle tube 223 and the outer tube 224 and the space between the outer tube 224 and the outermost tube 225 serve as a water supply path or a drain path to cool water. In other words, the top-blowing lance 203 includes the powdery smelting agent supply path 231, the fuel gas supply path 232, the combustion oxidizing gas supply path 233, and the refining oxidizing gas supply path 234 separately, and further includes the water supply path and drain path for cooling water.

The central hole 216 is a straight nozzle. The surrounding holes 219 are Laval nozzles composed of two cones having a decreasing cross section and an increasing cross section. The central hole 216 may also be Laval nozzles. The fuel gas nozzle 217 and the combustion oxidizing gas nozzle 218 are straight nozzles having an annular slit or straight nozzles having a circular cross section. The smallest cross section between two cones having a decreasing cross section and an increasing cross section in a Laval nozzle is referred to as a throat.

To reduce the hot metal blend ratio and increase the blend ratio of the cold iron source or increase the heat margin of hot metal (molten iron) using the smelting facility 201, the hot metal 226 is subjected to dephosphorization as described below.

First, the reaction vessel 202 is charged with a cold iron source. The cold iron source may be scrap iron such as crop scraps of cast billets, cast blooms or steel sheets produced in ironworks or domestic wastes, iron magnetically collected from slag, and further cold pig iron, or reduced iron. The blend ratio of the cold iron source is preferably 5% by mass or more of the total iron source (the blend ratio of the cold iron source (mass %)=the amount of cold iron source×100/(the amount of hot metal+the amount of cold iron source)). When the blend ratio of the cold iron source is less than 5% by mass, this results in an insignificant improvement in productivity and an insignificant reduction in $CO_2$ emission. The maximum blend ratio of the cold iron source is not particularly limited, provided that the temperature of the hot metal after dephosphorization is in a desired range.

The reaction vessel 202 is charged with the cold iron source and then with the hot metal 226. The hot metal 226 may have any composition. Preliminary dephosphorization may be preceded by desulfurization or desiliconization. The hot metal 226 before preliminary dephosphorization is mainly composed of carbon: 3.8% to 5.0% by mass, silicon: 0.3% by mass or less, phosphorus: 0.08% to 0.2% by mass, and sulfur: 0.05% by mass or less, approximately. The production of a large amount of slag 227 in the reaction vessel 202 during preliminary dephosphorization results in low dephosphorization efficiency. Thus, to reduce the amount of slag in the furnace to improve dephosphorization efficiency, silicon in the hot metal is preferably removed before preliminary dephosphorization before decarburization refining in a converter ("desiliconization of hot metal") such that the silicon concentration of the hot metal is 0.20% by mass or less, more preferably 0.10% by mass or less. Dephosphorization can be performed without problems when the temperature of hot metal is 1200° C. to 1400° C. In the case when desiliconization is performed, slag produced during desiliconization is removed before dephosphorization.

An inert gas is then supplied to the dispenser 213, and the powdery smelting agent 228, together with the inert gas is blown over the bath surface of the hot metal 226 through the central hole 216 of the top-blowing lance 203. Almost simultaneously with the blowing of the powdery smelting agent 228, a fuel gas is ejected through the fuel gas nozzle 217 of the top-blowing lance 203, and an oxidizing gas such as oxygen gas is ejected through the combustion oxidizing gas nozzle 218. A flame is formed downward in front of the nozzle of the top-blowing lance 203 toward the bath surface of the hot metal 226.

When a flame is formed at the tip of the top-blowing lance 203, the amounts of fuel gas and combustion oxidizing gas supplied to the top-blowing lance 203, or the flow ratio of the combustion oxidizing gas to the fuel gas and the ratio of the combustion oxidizing gas discharge velocity to the speed of sound are controlled in a predetermined range to satisfy formula (3) such that the ratio (l/L) of the flame length l to the top-blowing lance height L is 0.8 or more and 1.2 or less, thereby completely burning the fuel gas in the freeboard of the reaction vessel.

$$1.0 \leq (G/F)/(G/F)_{st} \leq 5.0 \quad (3)$$

G denotes the combustion oxidizing gas supply rate ($Nm^3$/min) through the top-blowing lance.

F denotes the fuel gas supply rate ($Nm^3$/min) through the top-blowing lance.

$(G/F)_{st}$ denotes the stoichiometric coefficient ratio of the combustion oxidizing gas required for complete combustion of the fuel gas to the fuel gas.

The top-blowing lance height L refers to the vertical distance from the stationary bath surface of the hot metal 226 to the tip of the nozzle of the top-blowing lance. The assumed value of the top-blowing lance height L is 0.5 to 2.0 m. This is because the value of freeboard of a refining container to which the hot metal 226 is charged ranges from approximately 0.5 to 2.0 m. The freeboard refers to the height (distance) from the stationary bath surface of the hot metal 226 to a charging port of the reaction vessel.

When $(G/F)/(G/F)_{st}$ is less than 1.0 or more than 5.0, the fuel gas may burn out before the fuel gas reaches the bath surface of the hot metal 226 in the reaction vessel 202, or unburned fuel may remain, resulting in low heat deposition efficiency of the powdery smelting agent 228. When $(G/F)/(G/F)_{st}$ is 1.0 or more and 5.0 or less, the ratio (l/L) of the flame length l to the top-blowing lance height L can be set between 0.8 or more and 1.2 or less. The top-blowing lance height L is the distance at which the powdery smelting agent 228 flows from the tip of the top-blowing lance 203 to the bath surface of the hot metal 226 and the flame is generated between the tip of the lance and the bath surface. When the ratio (l/L) of the flame length l to the top-blowing lance height L is close to 1 and is 0.8 or more and 1.2 or less, the fuel consumed by the flame of the top-blowing lance is efficiently consumed to heat the powdery smelting agent 228, and as demonstrated by Experiment 2 described below the flame of the top-blowing lance effectively heats the powdery smelting agent 228, resulting in high heat deposition efficiency.

In addition to formula (3), the combustion oxidizing gas supply rate G is preferably adjusted such that the combustion oxidizing gas discharge velocity satisfies formula (4) when a flame is generated.

$$1.0 \leq V_G/C \leq 3.0 \quad (4)$$

$V_G$ denotes the combustion oxidizing gas discharge flow velocity (Nm/s).

C denotes the speed of sound (Nm/s).

A $V_G/C$ value of less than 1.0 results in a poorly mixed state of the fuel gas and the combustion oxidizing gas and tends to result in incomplete combustion of the fuel gas in the space between the bath surface of the hot metal (molten iron) 226 and the tip of the top-blowing lance 203 even in a reaction vessel having a small freeboard. A $V_G/C$ value of more than 3.0 tends to result in burnout of the fuel gas before the fuel gas reaches the bath surface of the hot metal 226 and low heat deposition efficiency of the powdery smelting agent 228. This results in low heat deposition efficiency of the hot metal (molten iron) and makes it difficult to improve the heat margin of the hot metal (molten iron). Furthermore, when a cold iron source such as scrap iron is added to the hot metal 226 (molten iron), it is difficult to increase the blend ratio of the cold iron source.

When the fuel gas and the combustion oxidizing gas are supplied under the conditions that satisfy formulae (3) and (4), the fuel gas from the fuel gas nozzle 217 is adjacent to the combustion oxidizing gas from the combustion oxidizing gas nozzle 218 in all radial directions of the top-blowing lance 203 so that the fuel gas and combustion oxidizing gas interfere with each other. Thus, also because of a high ambient temperature, when the gas concentrations of the fuel gas and the combustion oxidizing gas are within their flammability limits, the gases burn and form a flame under the top-blowing lance 203 without an igniter. Furthermore, the heat deposition efficiency of the molten iron (molten iron) is expected to be further improved.

In the following experiment, it was demonstrated that the flame length l could be adjusted to the lance height L by supplying the fuel gas and the combustion oxidizing gas and controlling the amount of combustion oxidizing gas to be supplied to satisfy formulae (3) and (4).

<Experiment 3>

The flame length was investigated at different combustion oxidizing gas supply rates ($Nm^3$/min) and different combustion oxidizing gas ejection speeds (discharge velocities (Nm/s)) by using a reaction vessel facility similar to the smelting facility 201 illustrated in FIG. 8. The reaction vessel 202 of the smelting facility 201 can contain 200 tons of molten iron. The top-blowing lance 203 was disposed at a position where a top-blowing lance height L is 0.5 to 2.0 m. A plurality of lance main bodies 214 having the same dimensions were prepared and lance chips 215 each of which was different designs were prepared.

Each of the lance chips 215 had, in common with each other, a central hole having an inner diameter of 11.5 mm, a fuel gas nozzle having an annular slit gap of 1 mm, and surrounding holes of three-hole Laval nozzle each of the holes having a throat size of 4.3 mm disposed at an angle of 15 degrees with respect to the central axis of the lance, that is, all the surrounding holes were disposed at the same angle with respect to the central axis of the lance. On the other hand, the lance chips 215 had the combustion oxidizing gas nozzles 218 of different designs. The combustion oxidizing gas nozzles 218 were annular slit gaps. The lance chips 215 had different given dimensions of the annular slit gaps 0.5 to 1.5 mm.

Each of the lance chips 215 was welded to the corresponding lance main body 214 to assemble the top-blowing lances 203 including the combustion oxidizing gas nozzles 218 having different gaps. Thus, in forming a flame, the ejection speed (discharge velocity (Nm/s)) of the combustion oxidizing gas could be altered even when the combustion oxidizing gas flow rate ($Nm^3$/s) was fixed.

One top-blowing lance 203 was selected from the top-blowing lances 203. A fuel gas and a fuel gas combustion oxidizing gas were supplied through the selected top-blowing lance 203 to form a flame at the lower end of the top-blowing lance 203. The powdery smelting agent was supplied to the reaction vessel 202 through the circular straight central hole of the top-blowing lance 203. The fuel gas was supplied to the reaction vessel 202 through the annular (circular) fuel gas nozzle. The fuel gas combustion oxidizing gas was supplied to the reaction vessel 202 through the annular (circular) combustion oxidizing gas nozzle. The refining oxidizing gas was supplied to the reaction vessel 202 through the surrounding holes of the Laval nozzle type disposed on the concentric circle. A flame was formed more than once in this manner.

The fuel gas was propane gas (calorific value: 100.5 MJ/Nm³). The supply flow rate (supply rate) F of the propane gas was 1.0 Nm³/min. The fuel gas combustion oxidizing gas and the refining oxidizing gas were oxygen gas. The supply flow rate (supply rate) G of the fuel gas combustion oxidizing gas was 5 to 8.8 Nm³/min. The supply flow rate of the refining oxidizing gas was 46.2 to 50 Nm³/min. The total oxygen supply flow rate in the reaction vessel 2 was fixed to 55 Nm³/min. The stoichiometric coefficient ratio $(G/F)_{st}$ of the combustion oxidizing gas required for complete combustion of the propane gas to the propane gas was 5.0. The combustion oxidizing gas discharge velocity was equal to or higher than the speed of sound.

Figure 10:
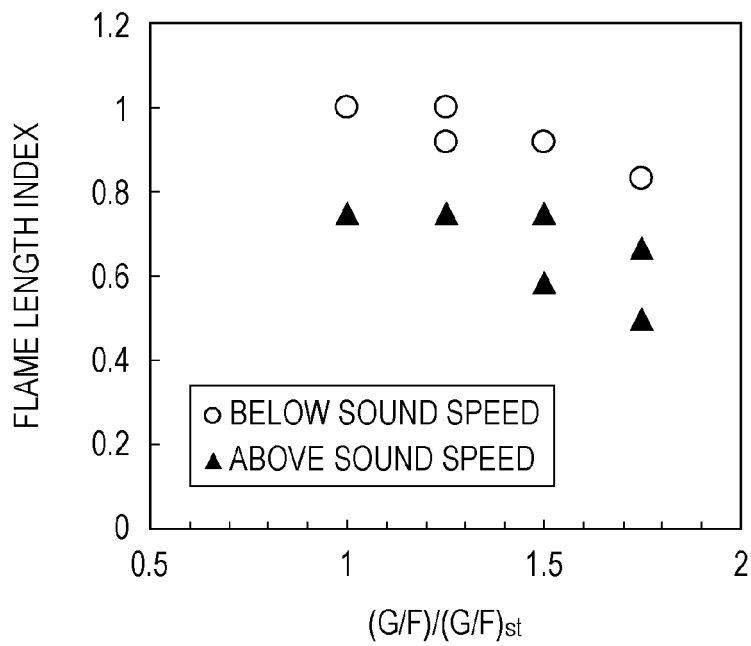
FIG. 10 is a graph of the relationship between the flow ratio of a combustion oxygen gas to propane gas and the flame length index in the third example.

After the fuel gas and the combustion oxidizing gas blown through the top-blowing lance 203 formed a stable flame, the flame length was visually measured under various conditions. FIG. 10 shows the measurement results. "(G/F)/(G/F)$_{st}$" on the horizontal axis in FIG. 10 refers to the flow ratio of the combustion oxidizing gas to the propane gas relative to $(G/F)_{st}$. The "flame length index" on the vertical axis in FIG. 10 refers to the ratio "$l/l_{st}$" of 1 to the flame length $l_{st}$ at the stoichiometric ratio. The supply flow rate (supply rate) F of the propane gas at $(G/F)_{st}$ was 1.0 Nm³/min. The supply flow rate (supply rate) G of the fuel gas combustion oxidizing gas at $(G/F)_{st}$ was 5.0 Nm³/min. The flame length was 1.2 m in this case.

As illustrated in FIG. 10, found that when the amount of combustion oxidizing gas to be supplied was altered and when the combustion oxidizing gas discharge velocity was above the speed of sound, the flame length varied relative to the flame length in the theoretical combustion in which the fuel gas and the combustion oxidizing gas burn completely. Since the flame length 1 at $(G/F)_{st}$ was 0.9 m and the top-blowing lance height L was 0.8 m, the flame length can be appropriately adjusted to the lance height by altering the amount of combustion oxidizing gas to be supplied.

Next, the heat deposition behavior on hot metal was studied by altering the top-blowing lance height L under the condition of the theoretical combustion ratio "(G/F)/(G/F)$_{st}$=1" in Experiment 3 (Experiment 4).

<Experiment 4>

Figure 11:
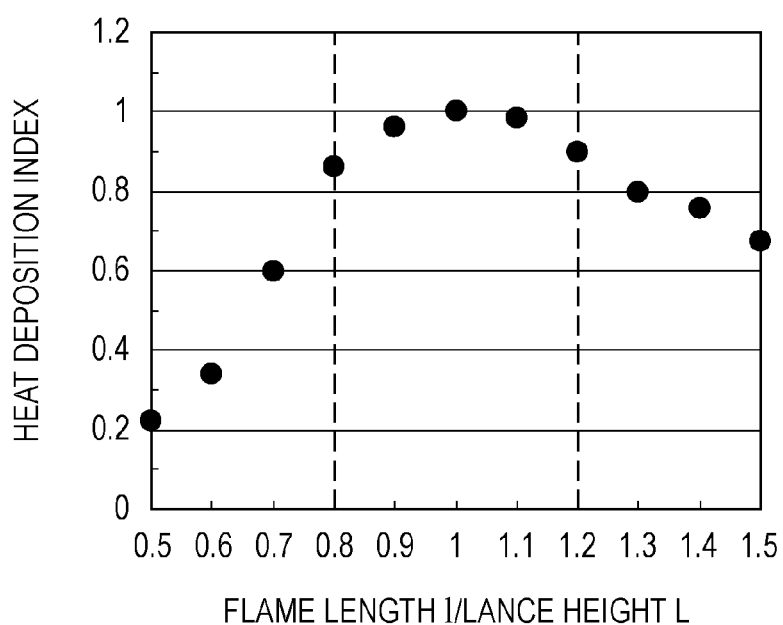
FIG. 11 is a graph of the relationship between the ratio (l/L) of the flame length l to the lance height L and the heat deposition index according to the third example. The heat deposition index is the ratio of deposited heat at each ratio (l/L) to deposited heat at a ratio (l/L)=1 at which the flame length l is equal to the lance height L.

In the case that the theoretical combustion ratio was one, the fuel gas and the fuel gas combustion oxidizing gas were supplied to the top-blowing lance 203 to form a flame at the lower end of the top-blowing lance 203 in the same manner as in Experiment 3 except for the theoretical combustion ratio "(G/F)/(G/F)$_{st}$=1". For (G/F)/(G/F)$_{st}$=1, 1 is 0.9 m. The powdery smelting agent was heated. The amounts of heat deposited on hot metal at different top-blowing lance heights L were calculated from the increase in temperature of molten iron. FIG. 11 illustrates the relationship between the ratio (l/L) of the flame length l to the lance height L and the heat deposition index. The heat deposition index is the ratio of deposited heat at each ratio (l/L) to deposited heat at a ratio (l/L)=1 at which the flame length l is equal to the lance height L. Deposition of heat on hot metal from the powdery smelting agent heated with the flame is assumed to be efficient when the heat deposition index is more than 0.8. FIG. 11 shows that such efficient deposition of heat was achieved at (l/L) of 0.8 to 1.2.

The powdery smelting agent 228 ejected from the central hole 216 together with the inert gas is heated or heated and melted with the heat of the flame, and the heated or melted powdery smelting agent 228 is blown over the bath surface of the hot metal 226. The heat of the powdery smelting agent 228 is deposited on the hot metal 226 and increases the temperature of the hot metal 226, thereby promoting the melt of the added cold iron source.

At the same time, the refining oxidizing gas such as oxygen gas is blown over the bath surface of the hot metal 226 through the surrounding holes 219 of the top-blowing lance 203. The dephosphorization reaction of the hot metal 226 proceeds such that phosphorus in the hot metal reacts with an oxidizing gas or iron oxide to form a phosphorus oxide ($P_2O_5$), and the phosphorus oxide is absorbed in the slag 227 formed by the slagging of calcium flux. The dephosphorization rate increases with the acceleration of slagging of calcium flux. Thus, the powdery smelting agent 228 is preferably calcium flux such as calcium oxide (CaO), limestone ($CaCO_3$), or hydrated lime ($Ca(OH)_2$). A mixture of calcium oxide and a slagging accelerator such as fluorite ($CaF_2$) or alumina ($Al_2O_3$) may be used as calcium flux. Converter slag (CaO—$SiO_2$ slag) produced in a decarburization blowing process of the hot metal 226 may be entirely or partly used as calcium flux.

Calcium flux blown over the bath surface of the hot metal 226 as the powdery smelting agent 228 immediately forms slag 227. The refining oxidizing gas reacts with phosphorus in the hot metal to form phosphorus oxide. The phosphorus oxide formed is rapidly absorbed into the slag 227. Thus, the dephosphorization reaction of the hot metal 226 proceeds rapidly. When calcium flux is not used as the powdery smelting agent 228, calcium flux is separately charged from a hopper, for example.

When the powdery smelting agent 228 contains iron oxide such as iron ore or mill scale the iron oxide serves as an oxygen source and reacts with phosphorus in the molten steel, thereby promoting the dephosphorization reaction. The iron oxide reacts with calcium flux to form a FeO—CaO compound on the surface of the calcium flux, thereby promoting the slagging of calcium flux and the dephosphorization reaction. When iron oxide containing a combustible substance such as blast furnace dust or converter dust is used, the combustible substance burns with the flame, and the heat of combustion of the combustible substance also contributes heating the hot metal 226.

When the powdery smelting agent 228 contains a combustible substance such as aluminum dross (Al oxide containing 30 to 50 mass % metallic Al produced by a reaction between Al and oxygen in the air when an Al ingot or scrap is melted in a melting furnace) or coke the combustible substance burns with the flame and, in addition to the heat of combustion of the fuel the heat of combustion of the combustible substance contributes to heating the hot metal 226. When a mixture of calcium flux, iron oxide and a combustible substance is used, their respective effects can be obtained.

The heat of the powdery smelting agent 228 heated or heated and melted with the flame formed from the top-blowing lance 203 is transferred to the hot metal 226. The heat of combustion of the flame at the tip of the top-blowing lance above the hot metal 226 is also transferred to the hot metal 226. The heat transferred to the hot metal 226, along with vigorous agitation of the hot metal 226 promotes the melt of the cold iron source in the hot metal. The cold iron source is completely melted during the dephosphorization.

When the phosphorus concentration of the hot metal 226 reaches its target value or less, all the supplies from the top-blowing lance 203 to the hot metal 226 are stopped, and the dephosphorization is completed.

As described above, the flame length can be smaller than or equal to the lance height corresponding to any of various lance heights by controlling the amount of heat of the fuel gas for forming a burner flame at the tip of the top-blowing lance per unit cross-sectional area at the fuel gas nozzle 212 and appropriately controlling the amount of oxygen gas to be supplied. As a result, the powdery smelting agent 228 supplied to the reaction vessel 202 through the top-blowing lance 203 can be continuously and consistently heated before reaching the bath surface of the hot metal 226. The heat of the powdery smelting agent 228 is securely deposited on the hot metal 226 and improves the heat margin of the hot metal 226. This can greatly increase the blend ratio of a cold iron source such as scrap iron in the oxidation refining of the hot metal 226, when hot metal 226 is used as molten iron in the smelting facility 201.

Our methods relate to the oxidation refining of molten iron in a reaction vessel. For example, we decarbonize the hot metal 226 in a converter to produce molten steel, transport the molten steel to another reaction vessel, and perform the oxidation refining of the molten steel in the reaction vessel. We improve the heat margin of molten iron such as hot metal or molten steel.

Example 3

Using a smelting facility 201 having the same dimensions as Experiments 3 and 4 and a plurality of top-blowing lances 203 in the same manner as in the experiments described above, the smelting facility 201 was charged with hot metal 226 and scrap iron, and each of the top-blowing lances 203 was inserted into the reaction vessel 202 at an appropriate lance height. Dephosphorization blowing (preliminary dephosphorization of hot metal) was performed more than once.

In the same manner as in the Experiments described above, propane gas was supplied to the top-blowing lance 203 as a fuel, and oxygen gas was supplied to the top-blowing lance 203 as a combustion oxidizing gas and a refining oxidizing gas. In the dephosphorization blowing, the amount of combustion oxidizing gas to be supplied was adjusted such that the ratio (l/L) of the flame length l to the top-blowing lance height L was 0.8 or more and 1.2 or less. (1) The combustion oxidizing gas was supplied to the top-blowing lance 203 such that the flow ratio (G/F) of the supply rate ($Nm^3$/min) of the combustion oxidizing gas supplied through a combustion oxidizing gas supply path to the supply rate ($Nm^3$/min) of the propane gas supplied through a fuel gas supply path was 1.0 to 5.0 times the stoichiometric coefficient ratio $(G/F)_{st}$ of the combustion oxidizing gas required for complete combustion of the fuel gas to the fuel gas. (2) The discharge velocity (Nm/s) of the combustion oxidizing gas was adjusted using one of the top-blowing lances 203 having different fuel gas nozzle slit gaps that had a combustion oxidizing gas nozzle 218 having a desired gap such that the ratio $(V_G/C)$ of the combustion oxidizing gas discharge velocity (m/s) to the speed of sound was 1.0 to 3.0 (Examples 31 to 35). The smelting facility 201 was operated in the same manner as in Example 31 except that the discharge velocity (Nm/s) of the combustion oxidizing gas was adjusted using appropriate one of the top-blowing lances 203 that brought $(V_G/C)$ outside 1.0 to 3.0 (Examples 36 and 37).

For comparison with Examples 31 to 37, the smelting facility 201 was operated such that at $(G/F)/(G/F)_{st}$ was outside 1.0 to 5.0 under conditions that the amount of supplied combustion oxidizing gas was the amount required for complete combustion (Comparative Examples 31 and 32). C denotes the speed of sound (Nm/s) and is approximately 1150 m/s in the vicinity of the hot metal having a temperature of 1350° C.

The reaction vessel 202 was charged with scrap iron such that no scrap iron remained unmelted after dephosphorization and was then charged with 200 tons of hot metal having a temperature of 1350° C. A mixed powder of calcium oxide, iron ore, and steel production dust, the fuel gas, the combustion oxidizing gas, and the refining oxidizing gas were then blown to the hot metal surface through the top-blowing lance 203.

The amount of scrap iron to be charged was adjusted such that the preliminary dephosphorization finish temperature was 1400° C. The amount of calcium oxide to be added was adjusted such that the basicity (mass % CaO/mass % $SiO_2$) of furnace slag was 2.5.

Table 10 shows the composition of the hot metal used in the dephosphorization.

TABLE 10

| Chemical composition of hot metal (mass %) | | | | | |
|---|---|---|---|---|---|
| C | Si | Mn | P | S | Cr |
| 4.4 | 0.20 | 0.21 | 0.120 | 0.011 | tr |

Table 11 shows the composition of the steel production dust which was used.

TABLE 11

| Chemical composition of steel production dust (mass %) | | | | | | |
|---|---|---|---|---|---|---|
| T. Fe | M. Fe | C | CaO | $SiO_2$ | $Al_2O_3$ | MgO |
| 77.0 | 61.4 | 1.1 | 4.9 | 1.9 | 0.3 | 2.0 |

Table 12 shows the setting values of the powdery smelting agent blowing rate, the flow rates of various gases flowing through the top-blowing lance, the top-blowing lance height, and the flame length l in the dephosphorization. The amount of fuel gas combustion oxidizing gas to be supplied was adjusted and resultant values of $(G/F)/(G/F)_{st}$ and $V_G/C$ are shown in Table 12.

TABLE 12

| | Top-blowing lance | | | | | | | | | |
|---|---|---|---|---|---|---|---|---|---|---|
| | Calcium oxide | Iron ore | Steel production dust | Propane gas F | Combustion oxidizing gas G | Refining oxidizing gas | $(G/F)/(G/F)_{st}$ | $V_G/C$ | Flame length | Lance height |
| | kg/min/hot metal ton | | | | Nm³/min/hot metal ton | | — | — | m | |
| Example 31 | 2.0 | 0.4 | 0.6 | 0.1 | 1.5 | 1.5 | 3.0 | 1.5 | 1.2 | 1.2 |
| Example 32 | 2.0 | 0.4 | 0.6 | 0.1 | 0.5 | 2.5 | 1.0 | 1.5 | 1.4 | 1.2 |
| Example 33 | 2.0 | 0.4 | 0.6 | 0.1 | 2.5 | 0.5 | 5.0 | 1.5 | 1.0 | 1.2 |
| Example 34 | 2.0 | 0.4 | 0.6 | 0.1 | 1.5 | 1.5 | 3.0 | 1.0 | 1.4 | 1.2 |
| Example 35 | 2.0 | 0.4 | 0.6 | 0.1 | 1.5 | 1.5 | 3.0 | 3.0 | 1.1 | 1.2 |
| Example 36 | 2.0 | 0.4 | 0.6 | 0.1 | 1.5 | 1.5 | 3.0 | 0.9 | 1.5 | 1.2 |
| Example 37 | 2.0 | 0.4 | 0.6 | 0.1 | 1.5 | 1.5 | 3.0 | 3.1 | 0.9 | 1.2 |
| Comparative Example 31 | 2.0 | 0.4 | 0.6 | 0.1 | 0.45 | 2.55 | 0.9 | 1.5 | 1.6 | 1.2 |
| Comparative Example 32 | 2.0 | 0.4 | 0.6 | 0.1 | 2.55 | 0.45 | 5.1 | 1.5 | 0.7 | 1.2 |

Table 13 shows the dephosphorization results obtained under the operation conditions and by the operation method described above. The scrap iron blend ratio was altered, and Table 13 shows the highest scrap iron blend ratio at which no scrap iron remained unmelted after dephosphorization.

TABLE 13

| | Blowing time min | Scrap iron blend ratio % |
|---|---|---|
| Example 31 | 8.0 | 6.0 |
| Example 32 | | 5.7 |
| Example 33 | | 5.5 |
| Example 34 | | 5.5 |
| Example 35 | | 5.5 |
| Example 36 | | 3.4 |
| Example 37 | | 3.2 |
| Comparative Example 31 | | 1.5 |
| Comparative Example 32 | | 1.3 |

As is clear from Table 13, a comparison of Examples 31 to 37 with Comparative Examples 31 and 32 with respect to the blowing time and the scrap iron blend ratio shows that our method allows operation at a high scrap iron blend ratio in hot metal even when the blowing time for preliminary dephosphorization of hot metal is fixed to 8 minutes. Examples 31 to 35, which satisfied the value of $V_G/C$ in the range of 1.0 or more and 3.0 or less, allow operation at a higher scrap iron blend ratio than Examples 36 and 37, which had the values of $V_G/C$ outside this range. Thus, more efficient preliminary dephosphorization of hot metal can be performed at the value of $V_G/C$ of 1.0 or more and 3.0 or less.

INDUSTRIAL APPLICABILITY

The heat of combustion by a burner can be efficiently transferred to molten iron through a powder. This can improve the efficiency of heat deposition on molten iron and can greatly reduce the hot metal blend ratio by using a large amount of scrap in dephosphorization refining and decarburization refining in a reaction vessel such as a converter.

Improved heat deposition efficiency can provide savings in the use of carbon materials and reduce $CO_2$ emission.

The invention claimed is:

1. A top-blowing lance having a burner function, comprising:
   a refining oxygen gas blowing nozzle having a plurality of ejection openings through which oxygen gas is blown into an iron bath in a reaction vessel, the ejection openings being disposed along a circular orbit at intervals; and
   a burner nozzle having an axis coaxial with the central axis of the circular orbit, forming a flame inside the refining oxygen gas blowing nozzle, and having ejection openings that blow a powder heated by the flame into the iron bath,
   wherein an indicator A that indicates a positional relationship between the ejection openings of the refining oxygen gas blowing nozzle and the ejection openings of the burner nozzle satisfies:

$A = 1.7(R-r-d/2)/L + \tan(\theta - 12°) - 0.0524 > 0$ where R denotes a pitch circle radius of the ejection openings of the refining oxygen gas blowing nozzle (mm),
   r denotes a radius of the ejection openings of the burner nozzle (mm),
   d denotes a diameter of the ejection openings of the refining oxygen gas nozzle (mm),
   θ denotes an angle (inclination) between an axis of the refining oxygen gas blowing nozzle and a central axis of the circular orbit (°), and
   L denotes a lance height (mm).

2. The top-blowing lance according to claim 1, wherein the top-blowing lance is a refining top-blowing lance used in dephosphorization refining or decarburization refining.

3. The top-blowing lance according to claim 2, wherein the ejection openings of the refining oxygen gas blowing nozzles are Laval nozzles, and wherein interference between the refining oxygen gas and the flame is reduced by satisfying A>0.

4. A method of refining molten iron in a reaction vessel using the top-blowing lance according to claim 1, comprising supplying a fuel for the burner nozzle which is one or two or more selected from the group consisting of gaseous fuels, liquid fuels and solid fuels.

5. The method according to claim 4, wherein the ejection openings of the refining oxygen gas blowing nozzles are Laval nozzles, and wherein interference between the refining oxygen gas and the flame is reduced by satisfying A>0.

6. A method of smelting reduction for charging a reaction vessel with a powder or grains of a metal oxide or an oxide ore and smelting and reducing the powder or the grains to produce molten metal, comprising blowing a powder auxiliary material or a granular auxiliary material of one or two or more of metal oxides and oxide ores into the reaction vessel through the burner nozzle of the top-blowing lance according to claim 1.

7. The method according to claim 6, wherein the ejection openings of the refining oxygen gas blowing nozzles are Laval nozzles, and wherein interference between the refining oxygen gas and the flame is reduced by satisfying A>0.

8. A method of refining molten iron with a top-blowing lance including a powdery smelting agent supply path, a fuel gas supply path, a combustion oxidizing gas supply path for a fuel gas, and a refining oxidizing gas supply path comprising:

supplying a fuel gas through the fuel gas supply path and supplying a combustion oxidizing gas through the combustion oxidizing gas supply path to form a flame in front of a nozzle of the top-blowing lance toward a molten iron bath surface in a converter; and supplying a powdery smelting agent through the powdery smelting agent supply path and supplying a refining oxidizing gas to the molten iron bath surface through the refining oxidizing gas supply path, while heating the powdery smelting agent with the flame and blowing the powdery smelting agent to the molten iron bath surface, wherein when the converter has a freeboard of 2.0 to 5.0 m, the top-blowing lance according to claim 1 is used as the top-blowing lance to form the flame such that the flow ratio of the combustion oxidizing gas to the fuel gas satisfies formula (1):

$$0.4 \leq (G/F)/(G/F)_{st} \leq 1.0 \tag{1}$$

where G denotes a combustion oxidizing gas supply rate ($Nm^3$/min),

F denotes a fuel gas supply rate ($Nm^3$/min), and $(G/F)_{st}$ denotes a stoichiometric coefficient ratio of the combustion oxidizing gas required for complete combustion of the fuel gas to the fuel gas.

9. The method according to claim 8, wherein the combustion oxidizing gas supply rate G is controlled such that the combustion oxidizing gas discharge velocity $V_G$ satisfies formula (2):

$$0.2 \leq V_G/C \leq 1.0 \tag{2}$$

where $V_G$ denotes a combustion oxidizing gas discharge velocity (Nm/s), and

C denotes the speed of sound (Nm/s).

10. The method according to claim 9, wherein the powdery smelting agent contains at least one of iron oxide, calcium flux, and combustible substances, and the powdery smelting agent, together with an inert gas, is supplied to the molten iron bath surface to perform oxidation refining of the molten iron to which a cold iron source has been added.

11. The method according to claim 8, wherein the powdery smelting agent contains at least one of iron oxide, calcium flux, and combustible substances, and the powdery smelting agent, together with an inert gas, is supplied to the molten iron bath surface to perform oxidation refining of the molten iron to which a cold iron source has been added.

12. The method according to claim 11, wherein the molten iron is hot metal, and the oxidation refining is preliminary dephosphorization of the hot metal.

13. The method according to claim 8, wherein the ejection openings of the refining oxygen gas blowing nozzles are Laval nozzles, and wherein interference between the refining oxygen gas and the flame is reduced by satisfying A>0.

14. A method of refining molten iron with a top-blowing lance including a powdery smelting agent supply path, a fuel gas supply path, a combustion oxidizing gas supply path for a fuel gas, and a refining oxidizing gas supply path comprising:

supplying a fuel gas through the fuel gas supply path and supplying a combustion oxidizing gas through the combustion oxidizing gas supply path to form a flame in front of a nozzle of the top-blowing lance toward a molten iron bath surface in a reaction vessel; and supplying a powdery smelting agent containing at least one of iron oxide, calcium flux and combustible substances to the molten iron bath surface together with an inert gas through the powdery smelting agent supply path and supplying a refining oxidizing gas to the molten iron bath surface through the refining oxidizing gas supply path, while heating the powdery smelting agent with the flame and blowing the powdery smelting agent to the molten iron bath surface, wherein when the reaction vessel has a freeboard of 0.5 to 2.0 m, the top-blowing lance according to claim 1 is used as the top-blowing lance to form the flame such that the flow ratio of the combustion oxidizing gas to the fuel gas satisfies formula (3):

$$1.0 \leq (G/F)/(G/F)_{st} \leq 5.0 \tag{3}$$

where G denotes a combustion oxidizing gas supply rate ($Nm^3$/min),

F denotes a fuel gas supply rate ($Nm^3$/min), and $(G/F)_{st}$ denotes a stoichiometric coefficient ratio of the combustion oxidizing gas required for complete combustion of the fuel gas to the fuel gas.

15. The method according to claim 14, wherein the combustion oxidizing gas supply rate G is controlled such that the combustion oxidizing gas discharge velocity satisfies formula (4):

$$1.0 \leq V_G/C \leq 3.0 \tag{4}$$

where $V_G$ denotes a combustion oxidizing gas discharge velocity (Nm/s), and

C denotes the speed of sound (Nm/s).

16. The method according to claim 15, wherein the molten iron is hot metal, and the refining of the molten iron with the refining oxidizing gas is dephosphorization of the hot metal.

17. The method according to claim 14, wherein the molten iron is hot metal, and the refining of the molten iron with the refining oxidizing gas is dephosphorization of the hot metal.

18. The method according to claim 14, wherein the ejection openings of the refining oxygen gas blowing nozzles are Laval nozzles, and wherein interference between the refining oxidizing gas and the flame is reduced by satisfying A>0.

19. A method of refining molten iron in a reaction vessel using the top-blowing lance according to claim 2, comprising supplying a fuel for the burner nozzle which is one or two or more selected from the group consisting of gaseous fuels, liquid fuels and solid fuels.

20. A method of smelting reduction for charging a reaction vessel with a powder or grains of a metal oxide or an oxide ore and smelting and reducing the powder or the grains to produce molten metal, comprising blowing a powder auxiliary material or a granular auxiliary material of one or two or more of metal oxides and oxide ores into the reaction vessel through the burner nozzle of the top-blowing lance according to claim 2.

* * * * *